(12) United States Patent
Nakamura

(10) Patent No.: US 11,196,959 B2
(45) Date of Patent: Dec. 7, 2021

(54) IMAGING APPARATUS, CONTROL METHOD OF THE SAME, AND STORAGE MEDIUM

(71) Applicant: CANON KABUSHIKI KAISHA, Tokyo (JP)

(72) Inventor: Tatsuya Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/844,355

(22) Filed: Apr. 9, 2020

(65) Prior Publication Data

US 2020/0344441 A1    Oct. 29, 2020

(30) Foreign Application Priority Data

Apr. 26, 2019 (JP) .............................. JP2019-085420

(51) Int. Cl.
*H04N 5/907* (2006.01)
*H04N 5/232* (2006.01)
*H04N 5/262* (2006.01)

(52) U.S. Cl.
CPC ......... *H04N 5/907* (2013.01); *H04N 5/23212* (2013.01); *H04N 5/2621* (2013.01)

(58) Field of Classification Search
CPC ........................................................ H04N 5/907
USPC ..................................................... 348/231.99
See application file for complete search history.

(56) References Cited

U.S. PATENT DOCUMENTS

2009/0324007 A1\* 12/2009 Oya .................... H04N 1/2166
382/100

FOREIGN PATENT DOCUMENTS

JP    2005-236484 A    9/2005

\* cited by examiner

*Primary Examiner* — Joel W Fosselman
(74) *Attorney, Agent, or Firm* — Canon U.S.A., Inc. IP Division

(57) ABSTRACT

An imaging apparatus that captures moving image data including a plurality of frame images and records the moving image data onto a recording medium, includes an operation unit configured to receive a predetermined operation, a detection unit configured to detect, in response to receiving the predetermined operation during image capturing and recording of the moving image data, a frame image generated in the vicinity of receiving the predetermined operation and is in a predetermined state, and a recording unit configured to record a specific information in association with the detected frame image.

16 Claims, 14 Drawing Sheets

IMAGING APPARATUS, CONTROL METHOD OF THE SAME, AND STORAGE MEDIUM

BACKGROUND

Field

The present disclosure relates to an imaging apparatus, a control method of the same, a storage medium, and an information processing apparatus.

Description of the Related Art

The performance of imaging apparatuses such as digital cameras has recently been getting higher and higher as a result of the development in electronics and computing techniques. In particular, an amount of information processable per unit time has increased, and the image capturing and recording of moving images with higher resolution and higher frame rate have become possible. Such image apparatuses can therefore capture and record higher-quality moving images. The higher resolution refers to 4096 pixels in a traverse direction and 2160 pixels in a lengthwise direction, for example. The higher frame rate refers to 60 frames per second (fps), 120 fps, or 240 fps, for example.

Consequently, it has become possible to capture and record a high-resolution moving image and use a frame image in the moving image also as a still image. For example, the acquired moving image is used as an Internet delivery moving image, and the acquired still image is printed and used as a photo.

Japanese Patent Application Laid-Open No. 2005-236484 discusses a technique of adding a candidate flag to an image frame position. When an operation of a zoom/wide button is detected during the capturing of a moving image, for setting an image frame position determined based on the detection time point, as an output candidate position of a still image, the technique adds a candidate flag to the image frame position.

SUMMARY

Nevertheless, it has now been determined that in a case where a frame image captured when a predetermined operation is performed during the capturing and recording of moving image data is set as an output candidate of a still image, the frame image may be out of focus in some cases.

In such cases, a selection work of a frame image is performed again. Furthermore, a still image output work is sometimes performed again. Reducing working hours by simplifying and streamlining work procedures is a significant challenge especially in an image editing work for a business purpose because cost is incurred in accordance with working hours.

The present disclosure has been devised in view of the foregoing points, and an aspect features reflecting a timing intended by a user among frame images included in a moving image, and enabling a frame image captured in a desirable imaging control state, to be used as a still image.

According to another aspect of the present disclosure, an imaging apparatus that captures moving image data including a plurality of frame images and records the moving image data onto a recording medium, includes an operation unit configured to receive a predetermined operation, a detection unit configured to detect, in response to receiving the predetermined operation during image capturing and recording of the moving image data, a frame image generated in the vicinity of receiving the predetermined operation and is in a predetermined state, and a recording unit configured to record a specific information in association with the detected frame image.

Further features of the present disclosure will become apparent from the following description of exemplary embodiments with reference to the attached drawings.

DESCRIPTION OF THE EMBODIMENTS

Hereinafter, exemplary embodiments of the present disclosure will be described with reference to the attached drawings.

Figure 1:
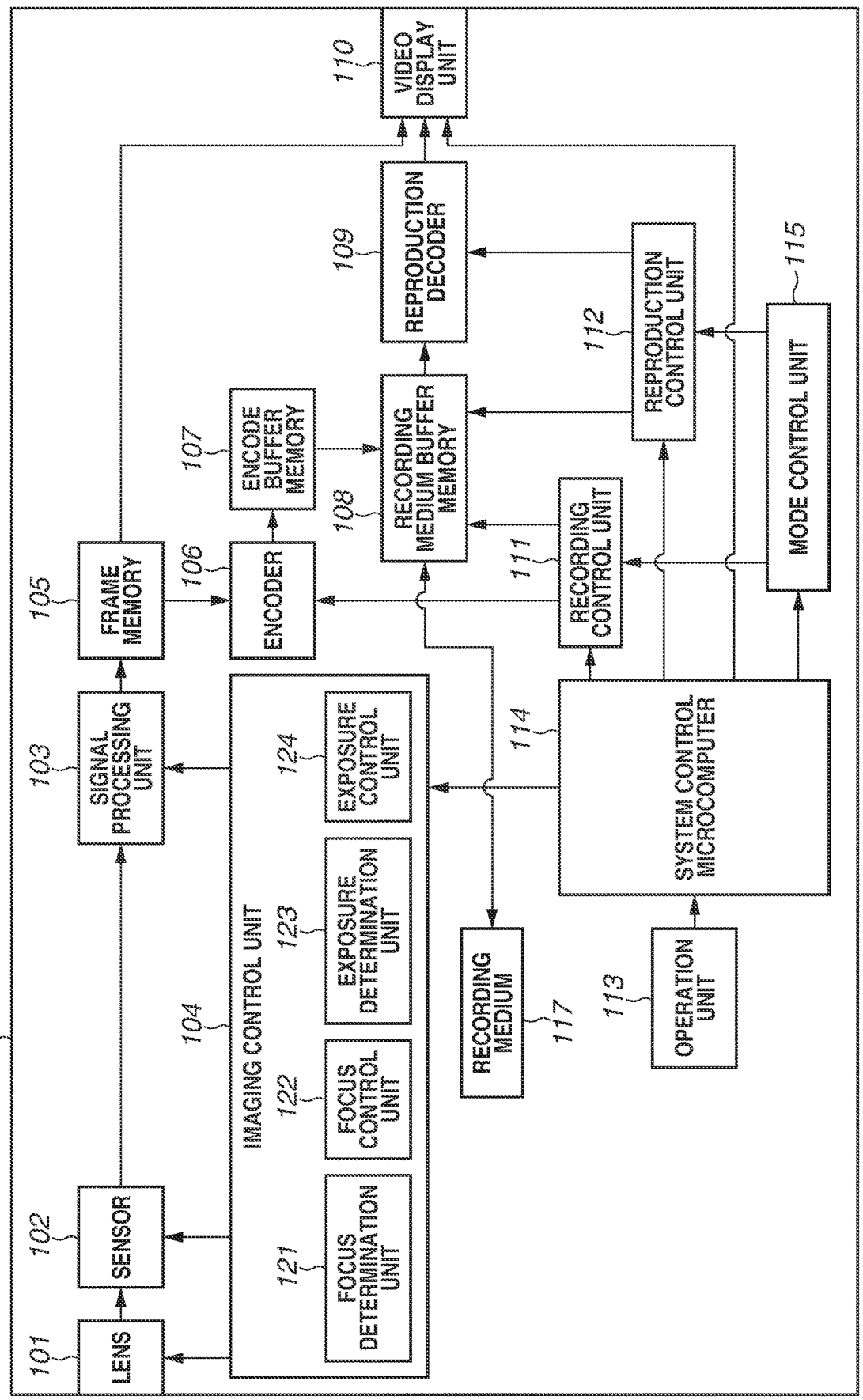
FIG. 1 is a block diagram illustrating a configuration of an imaging apparatus according to a first exemplary embodiment.

FIG. 1 is a block diagram illustrating a configuration of an imaging apparatus 100 according to a first exemplary embodiment.

A lens 101 adjusts an optical path of light emitted or reflected from a subject. A sensor (photoelectric conversion element) 102 receives the light the optical path of which has been adjusted by the lens 101, and converts the received light into an electric signal. A signal processing unit 103 inputs the electric signal converted and output by the sensor 102, and generates image data by performing amplification, debayering, and other types of image-related processing.

An imaging control unit 104 comprehensively controls the lens 101, the sensor 102, and the signal processing unit 103, and performs desired image capturing. The imaging control unit 104 includes a focus determination unit 121, a focus control unit 122, an exposure determination unit 123, and an exposure control unit 124. The focus determination unit 121 determines whether a subject image formed on the sensor 102 through the lens 101 is in an in-focus state. In accordance with a determination result obtained by the focus determination unit 121, the focus control unit 122 controls the position of the lens 101 so as to cause the in-focus state. The exposure determination unit 123 determines an exposure state of the subject image formed on the sensor 102. In accordance with a determination result obtained by the exposure determination unit 123, the exposure control unit 124 performs gain control of the signal processing unit 103.

A frame memory 105 temporarily stores image data generated by the signal processing unit 103. An encoder 106 encodes the image data stored in the frame memory 105, and generates coded data. An encode buffer memory 107 temporarily stores the coded data generated by the encoder 106.

A recording medium 117 records image data captured and recorded by the imaging apparatus 100. A recording medium buffer memory 108 is used for temporarily storing image data when image data recorded on the recording medium 117 is read out and writing is performed into the recorded image data. The coded data stored in the encode buffer memory 107 is transferred to the recording medium buffer memory 108, and transferred to and recorded onto the recording medium 117.

A reproduction decoder 109 reads the coded data to be reproduced, from among pieces of data recorded in the recording medium buffer memory 108, and decodes the read data. A video display unit 110 displays image data decoded by the reproduction decoder 109. The user can accordingly view a reproduced image. The video display unit 110 can also directly display image data generated by the frame memory 105. This enables the user to occasionally check image data to be captured and recorded, before the execution and during the execution of image capturing and recording.

A recording control unit 111 controls recording in the imaging apparatus 100. In controlling the recording, the recording control unit 111 controls operations of the encoder 106 and the recording medium buffer memory 108 as necessary. A reproduction control unit 112 controls reproduction in the imaging apparatus 100. In controlling the reproduction, the reproduction control unit 112 controls operations of the recording medium buffer memory 108 and the reproduction decoder 109 as necessary.

The user inputs various operation instructions related to the imaging apparatus 100 to an operation unit 113 via an operation input member (not illustrated) such as a button or a touch panel. An operation instruction signal corresponding to an operation instruction issued via the operation unit 113 is transmitted to a system control microcomputer 114, and the recording control unit 111 executes recording control under the control of the system control microcomputer 114. The operation instruction signal is similarly transmitted to the system control microcomputer 114, and the reproduction control unit 112 executes reproduction control under the control of the system control microcomputer 114.

The system control microcomputer 114 controls each unit of the imaging apparatus 100. The system control microcomputer 114 detects an operation instruction input by the user via the operation unit 113, and transmits a control request to the imaging control unit 104, the recording control unit 111, the reproduction control unit 112, and a mode control unit 115.

The mode control unit 115 executes mode control of the imaging apparatus 100. The mode control unit 115 controls an operation mode of the recording control unit 111 and the reproduction control unit 112.

In accordance with an operation instruction input by the user via the operation unit 113, the system control microcomputer 114 determines a shutter speed to be used in image capturing and recording. In accordance with the determined shutter speed, the system control microcomputer 114 transmits a control signal to the imaging control unit 104. In accordance with the control signal received from the system control microcomputer 114, the imaging control unit 104 drives the sensor 102, controls an exposure time and a light shielding time, and controls an electronic shutter. In addition, the shutter speed determined by the system control microcomputer 114 can be displayed on the video display unit 110. The user can accordingly occasionally check a control state related to a shutter speed.

In accordance with an operation instruction input by the user via the operation unit 113, the system control microcomputer 114 determines a frame rate to be used in image capturing and recording. In accordance with the determined frame rate, the system control microcomputer 114 transmits a control signal to the imaging control unit 104. In accordance with the control signal received from the system control microcomputer 114, the imaging control unit 104 drives the sensor 102, and controls an operation cycle of the sensor 102 related to exposure and light shielding, in other words, a frame rate. In accordance with the control signal received from the system control microcomputer 114, the imaging control unit 104 also controls the signal processing unit 103, and controls an operation cycle of the signal processing unit 103, in other words, a frame rate. In this manner, the imaging control unit 104 controls a frame rate while synchronizing the operation cycles of the sensor 102 and the signal processing unit 103. In addition, the frame rate determined by the system control microcomputer 114 can be displayed on the video display unit 110. The user can accordingly occasionally check a control state related to a frame rate.

Figure 2:
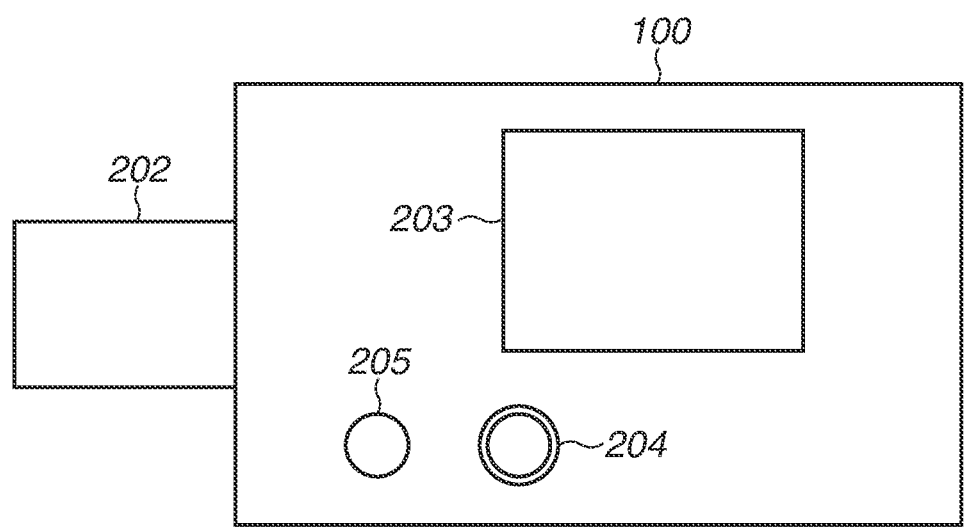
FIG. 2 is a diagram schematically illustrating a part of an external appearance configuration of the imaging apparatus according to the first exemplary embodiment.

FIG. 2 is a diagram schematically illustrating a part of an external appearance configuration of the imaging apparatus 100.

The imaging apparatus 100 includes a lens unit 202, a display 203, and a recording button 204 and a frame selection button 205 that are included in the operation unit 113.

The lens unit 202 accommodates the lens 101.

The display 203 corresponds to the video display unit 110, and displays a video. The recording button 204 is a button for instructing a start and an end of image capturing and recording of moving image data (hereinafter, will be simply referred to as moving image recording). Moving image recording starts when the user presses the recording button 204 (hereinafter, will be referred to as "fully pressed"), and the moving image recording ends when the user presses the recording button 204 again. The recording button 204 can also be brought into a half-pressed state. By bringing the recording button 204 into the half-pressed state, autofocus (hereinafter, described as "AF") control is started.

The frame selection button 205 is a button for a frame selection operation. In accordance with the operation of the frame selection button 205, frame selection metadata can be applied to a specific frame image of a moving image. By providing the frame selection button 205 in this manner, an operation of selecting an output candidate frame of a still image and recording frame selection metadata becomes possible. With this configuration, it is possible to record output candidate position information of a still image together while recording a moving image. In the present exemplary embodiment, the frame selection button 205 can be brought into a half-pressed state, and by bringing the frame selection button 205 into the half-pressed state, frame selection metadata being frame selection information is applied and the AF control is started.

A focusing degree varies in accordance with the state of the AF control of the imaging apparatus 100, and a change state of a subject. For example, when a change amount of a subject is relatively small and the AF control can track the subject, an in-focus state is caused. If the frame selection button 205 is operated in this state, frame selection metadata can be applied to an in-focus frame image. On the other hand, for example, when a change amount of a subject is relatively large and the AF control cannot track the subject, an out-of-focus state is caused. If the frame selection button 205 is operated in this state, frame selection metadata is applied to an out-of-focus frame image.

In view of the foregoing, as described in detail below, first frame selection metadata serving as a first candidate and second frame selection metadata serving as a second candidate are applied during the moving image recording in accordance with the operation of the frame selection button 205 and the state of the AF control.

Figure 3:
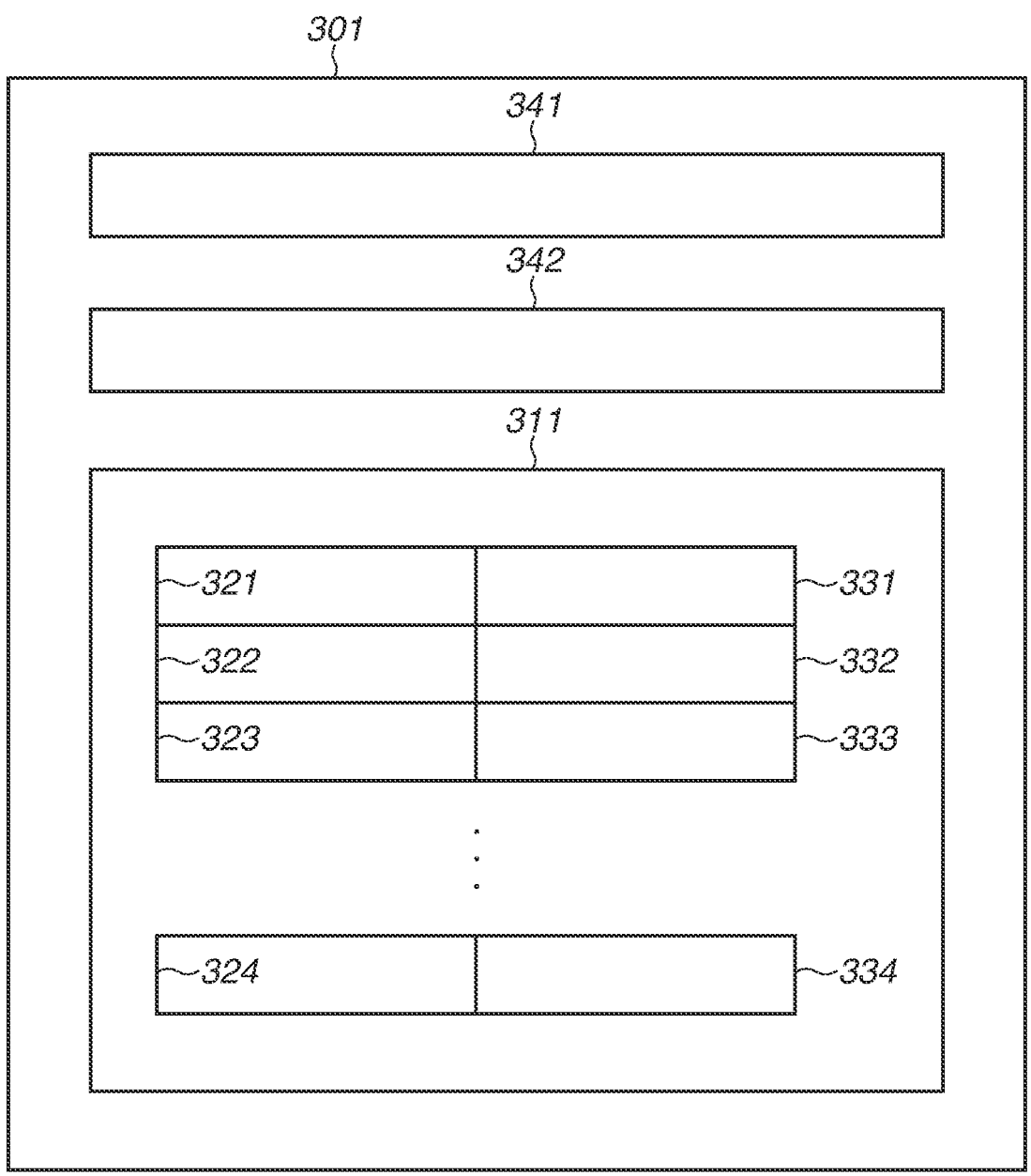
FIG. 3 is a diagram illustrating a data structure of a moving image data file according to the first exemplary embodiment.

FIG. 3 is a diagram illustrating a data structure of a moving image data file 301 to be recorded onto the recording medium 117.

The moving image data file 301 includes moving image data 311. The moving image data 311 includes time code data pieces 321 to 324, and frame image data pieces 331 to 334 included in the moving image data 311. In the example illustrated in FIG. 3, the time code data 321 corresponds to the frame image data 331. Specifically, the time code data 321 indicates a time at which the frame image data 331 has been captured and recorded. In like manner, the time code data 322 corresponds to the frame image data 332, the time code data 323 corresponds to the frame image data 333, and the time code data 324 corresponds to the frame image data 334.

The moving image data file 301 also includes first frame selection metadata 341 and second frame selection metadata 342. In the frame selection metadata 341 and 342, time code data corresponding to frame image data serving as an output candidate of a still image is recorded. By applying frame selection metadata in this manner, it is possible to perform a still image output work by selecting a frame image in accordance with the frame selection metadata, after moving image recording is completed. The still image output work can be performed using image editing software operating in a personal computer, for example, and generates still image data by performing compression coding of a frame image in a JPEG format. When a frame image is RAW data, RAW development processing is executed, compression coding processing is executed on data having been subjected to image adjustment, and still image data is generated.

Figure 4:
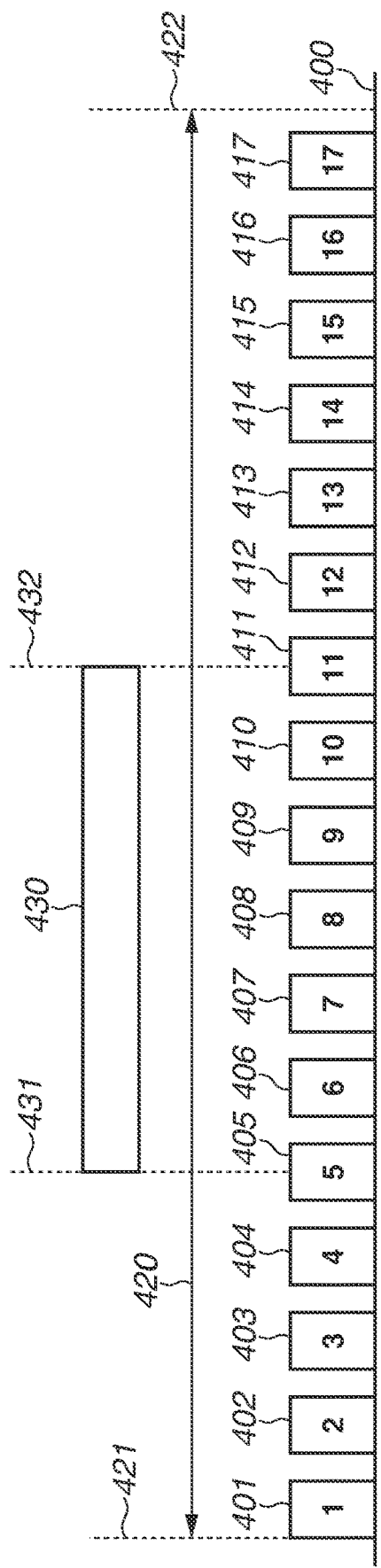
FIG. 4 is a diagram illustrating a timing relationship between a frame selection button operation, autofocus control, and frame selection metadata application according to the first exemplary embodiment.

FIG. 4 is a diagram illustrating a timing relationship between a frame selection button operation, AF control, and frame selection metadata application according to the first exemplary embodiment.

Moving image data 400 includes frame image data pieces 401 to 417.

A timing 421 indicates a moving image recording start timing and a timing 422 indicates a moving image recording end timing. A period between the timings 421 and 422 becomes a moving image recording period 420.

The moving image recording start timing 421 indicates a timing at which the recording button 204 is fully pressed by the user. By the recording button 204 being fully pressed, the operation unit 113 notifies the system control microcomputer 114 that the recording button 204 has been fully pressed. In accordance with a full press notification of the recording button 204 that has been issued from the operation unit 113, the system control microcomputer 114 notifies the recording control unit 111 of a recording start instruction. In accordance with the notification issued from the system control microcomputer 114, the recording control unit 111 notifies the encoder 106 and the recording medium buffer memory 108 of the start of recording processing. The encoder 106, the encode buffer memory 107, and the recording medium buffer memory 108 start the recording processing, and the time code data 321 and the frame image data 331 are recorded onto the recording medium 117.

The moving image recording end timing 422 indicates a timing at which the recording button 204 is fully pressed again by the user. The operation unit 113 notifies the system control microcomputer 114 that the recording button 204 has been fully pressed when the recording button 204 is fully pressed again. In accordance with a full press notification of the recording button 204 that has been issued from the operation unit 113, the system control microcomputer 114 notifies the recording control unit 111 of a recording end instruction. In accordance with the notification issued from the system control microcomputer 114, the recording control unit 111 notifies the encoder 106 and the recording medium buffer memory 108 of the end of recording processing. The encoder 106, the encode buffer memory 107, and the recording medium buffer memory 108 end the recording processing. As a result, last time code data and frame image data (the time code data 324 and the frame image data 334 in the example illustrated in FIG. 3) are recorded onto the recording medium 117, and the recording ends.

In the moving image recording period 420, a timing 431 indicates a timing at which a frame selection button is half pressed, and a timing 432 indicates a timing at which an in-focus state is determined. A period between the timings 431 and 432 becomes an AF control period 430.

The frame selection button half pressed timing 431 indicates a timing at which the frame selection button 205 is half pressed by the user. The operation unit 113 notifies the system control microcomputer 114 that the frame selection button 205 has been half pressed when the frame selection button 205 is half pressed. In accordance with a half press notification of the frame selection button 205 that has been issued from the operation unit 113, the system control microcomputer 114 notifies the focus control unit 122 included in the imaging control unit 104 of an AF control start. In accordance with the notification from the system control microcomputer 114, the focus control unit 122 drives the lens 101 in such a manner that the focus determination unit 121 determines an in-focus state.

In accordance with the half press notification of the frame selection button 205 that has been issued from the operation unit 113, the system control microcomputer 114 also notifies the recording control unit 111 of the recording of the second frame selection metadata 342. In accordance with the notification issued from the system control microcomputer 114, the recording control unit 111 notifies the encoder 106 and the recording medium buffer memory 108 of a start of recording processing. The encoder 106, the encode buffer memory 107, and the recording medium buffer memory 108 start recording processing, and the second frame selection metadata 342 is recorded onto the recording medium 117.

The in-focus state determination timing 432 indicates a timing at which an in-focus state is determined by the focus determination unit 121 included in the imaging control unit 104. If the system control microcomputer 114 detects that the in-focus state is determined by the focus determination unit 121, the first frame selection metadata 341 is applied to the frame image 411 generated from a subject image captured at the timing 432 at which the in-focus state is determined, and the first frame selection metadata 341 is recorded.

Figure 5:
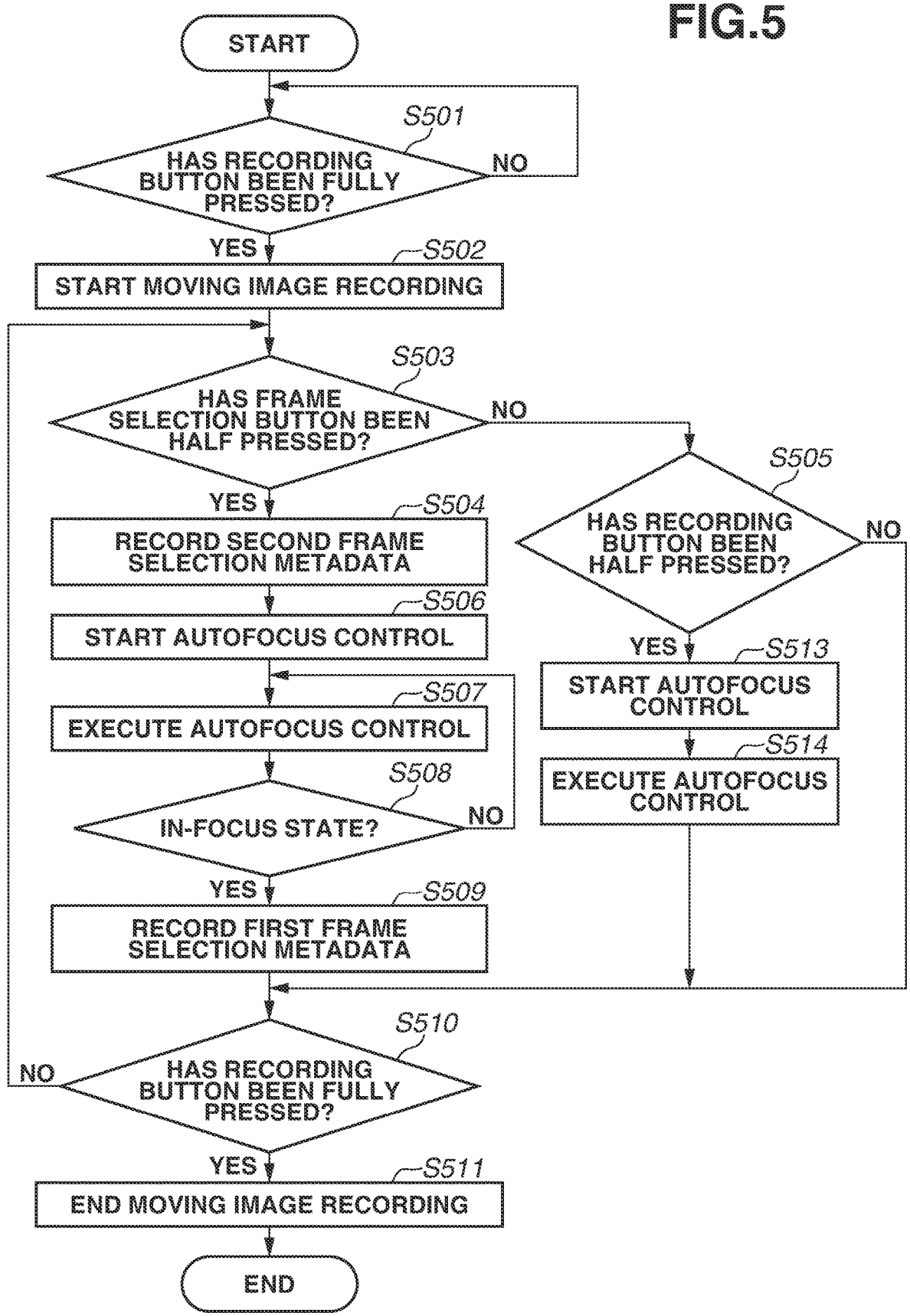
FIG. 5 is a flowchart illustrating moving image recording processing executed by the imaging apparatus according to the first exemplary embodiment.

FIG. 5 is a flowchart illustrating moving image recording processing executed under the control of the system control microcomputer 114 according to the first exemplary embodiment.

In step S501, the system control microcomputer 114 determines whether the recording button 204 is in a fully-pressed state. The system control microcomputer 114 waits until the recording button 204 enters the fully-pressed state, and if the recording button 204 enters the fully-pressed state (YES in step S501), the processing proceeds to step S502.

In step S502, the system control microcomputer 114 starts moving image recording. The moving image recording start timing corresponds to the moving image recording start timing 421 illustrated in FIG. 4.

In step S503, the system control microcomputer 114 determines whether the frame selection button 205 is in a half-pressed state. If the frame selection button 205 is in the half-pressed state (YES in step S503), the processing proceeds to step S504. If the frame selection button 205 is not in the half-pressed state (NO in step S503), the processing proceeds to step S505.

If the system control microcomputer 114 detects that the frame selection button 205 is determined to be in the half-pressed state, in step S504, the system control microcomputer 114 instructs the recording control unit 111 to record second frame selection metadata. In accordance with the notification issued from the system control microcomputer 114, the recording control unit 111 notifies the encoder 106 and the recording medium buffer memory 108 of a start of recording processing. The encoder 106, the encode buffer memory 107, and the recording medium buffer memory 108 start recording processing, and record the second frame selection metadata 342 onto the recording medium 117 in association with the frame image 405 corresponding to the frame selection button half pressed timing 431.

In step S506, the system control microcomputer 114 starts the AF control. The system control microcomputer 114 starts the in-focus state determination performed by the focus determination unit 121, and the position control of the lens 101 that is performed by the focus control unit 122 in accordance with the determination result.

In step S507, the system control microcomputer 114 continues the AF control. The system control microcomputer 114 detects how an in-focus state determination result obtained by the focus determination unit 121 changes in accordance with a position control result of the lens 101 that is obtained by the focus control unit 122. The system control microcomputer 114 further reflects the detection result in the position control of the lens 101 that is performed by the focus control unit 122.

In step S508, the system control microcomputer 114 determines whether an in-focus state is caused. If the in-focus state is not caused (NO in step S508), the processing returns to step S507 and the AF control is continued. If the in-focus state is caused (YES in step S508), the processing proceeds to step S509.

In step S509, the system control microcomputer 114 instructs the recording control unit 111 to record the first frame selection metadata 341. In accordance with the instruction issued from the system control microcomputer 114, the recording control unit 111 notifies the encoder 106 and the recording medium buffer memory 108 of a start of recording processing. The encoder 106, the encode buffer memory 107, and the recording medium buffer memory 108 start the recording processing, and record first frame selection metadata onto the recording medium 117 in association with the frame image 411 generated from the subject image captured at the timing 432 at which the in-focus state is determined. Then, the processing proceeds to step S510.

On the other hand, in step S505, the system control microcomputer 114 determines whether the recording button 204 is in a half-pressed state. If the recording button 204 is in the half-pressed state (YES in step S505), the processing proceeds to step S513. If the recording button 204 is not in the half-pressed state (NO in step S505), the processing proceeds to step S510.

In step S513, the system control microcomputer 114 starts the AF control. The processing performed in step S513 is the same as the processing performed in step S506.

In step S514, the system control microcomputer 114 continues the AF control. The processing performed in step S514 is the same as the processing performed in step S507. Then, the processing proceeds to step S510.

In step S510, the system control microcomputer 114 determines whether the recording button 204 is in a fully-pressed state. If the recording button 204 is not in the fully-pressed state (NO in step S510), the processing returns to step S503. If the recording button 204 is in the fully-pressed state (YES in step S510), the processing proceeds to step S511.

In step S511, the system control microcomputer 114 ends the moving image recording. The timing at which the moving image recording ends corresponds to the moving image recording end timing 422 illustrated in FIG. 4. By the moving image recording processing, moving image data including pieces of frame image data starting from the frame image data 401 corresponding to the moving image recording start timing 421, and ending with the frame image data 417 corresponding to the moving image recording end timing 422 is recorded onto the recording medium 117.

As described above, during the image capturing and recording of moving image data, frame selection metadata is applied to a frame image generated when a frame selection operation of bringing the frame selection button 205 into a half-pressed state is performed, and a frame image generated when an in-focus state is determined.

More specifically, in steps S506 to S509, the AF control is executed, and frame selection metadata is applied in accordance with an in-focus state determination result. The frame selection metadata is accordingly applied not only to a frame image corresponding to a timing of a user operation, but also to an in-focus frame image near the frame image. The work efficiency of a still image output work to be performed on editing software using frame selection metadata can be accordingly enhanced.

The AF control is started in accordance with a result of half-pressed state determination of the frame selection button 205 that is performed in step S503. This enables an AF control operation and a frame selection button operation to be performed via the same button, and can simplify an image capturing operation.

In particular, in steps S508 and S509, frame selection metadata is applied at a time point at which an out-of-focus state changes to an in-focus state. The frame selection metadata can be accordingly applied to a frame image generated when an in-focus state is determined after the frame selection button 205 is half pressed, that is to say, to a frame image generated at a shortest timing to an in-focus state. The frame selection metadata reflecting a timing intended by the user can be therefore applied.

In steps S503 and S504, frame selection metadata is applied also to a frame image generated when the frame selection button 205 is half pressed. With this configuration, a plurality of candidates to be used in a still image output performed on editing software is presented including a frame image generated not in an in-focus state but at a timing of a user operation. Thus, when the user places importance on a timing and does not prefer a time required from when the AF control is started to when an in-focus state is caused, a range of options of image representation to be selected by the user can be widened. Specifically, a frame image that is a frame image generated at a timing at which the frame selection button 205 is half pressed, but is not sufficiently in an in-focus state, and a frame image that is generated after a focus control required time elapses from the timing at which the frame selection button 205 is half pressed, but is sufficiently in the in-focus state are presented as candidates of a still image output. The user can compare both of such frame images and select either one of the frame images.

It accordingly becomes possible to reflect a timing intended by the user and use an in-focus frame image as a still image.

Next, a second exemplary embodiment will be described. The configuration and basic processing operations of the imaging apparatus 100 are alike those in the first exemplary embodiment. Hereinafter, a difference from the first exemplary embodiment will be mainly described. In the first exemplary embodiment, the description has been given of an example of executing a one-shot AF in which tracking control is started in accordance with a predetermined operation, and the control is stopped at a time point at which an in-focus state is caused. In the second exemplary embodiment, the description will be given of an example of executing a continuous AF in which tracking control is continuously continued.

In the second exemplary embodiment, frame selection metadata is applied by bringing the frame selection button 205 into a half-pressed state, but the start of the AF control does not originate from the half press. More specifically, a frame selection operation of bringing the frame selection button 205 into a half-pressed state also serves as an operation of starting the AF control in the first exemplary embodiment, but in the second exemplary embodiment, a frame selection operation of bringing the frame selection button 205 into a half-pressed state is an operation unrelated to focus control.

Figure 6:
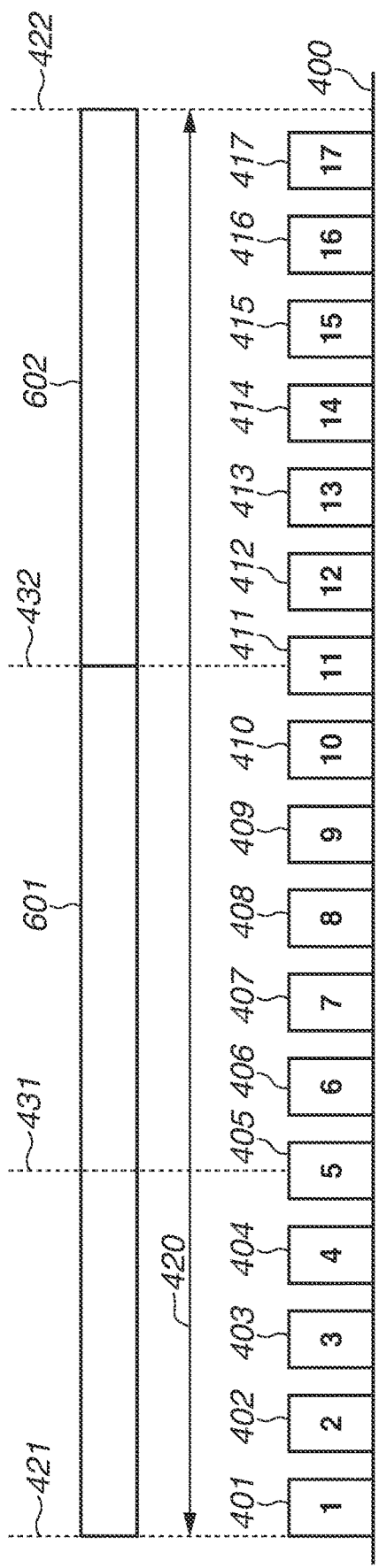
FIG. 6 is a diagram illustrating a timing relationship between a frame selection button operation, autofocus control, and frame selection metadata application according to a second exemplary embodiment.

FIG. 6 is a diagram illustrating a timing relationship between a frame selection button operation, AF control, and frame selection metadata application according to the second exemplary embodiment.

In contrast to FIG. 4, FIG. 6 does not include the AF control period 430. In this example, a period from the moving image recording start timing 421 to the in-focus state determination timing 432 is an out-of-focus period 601 in which an out-of-focus state is continued. In addition, a period from the in-focus state determination timing 432 to the moving image recording end timing 422 is an in-focus period 602 in which an in-focus state is continued.

Figure 7:
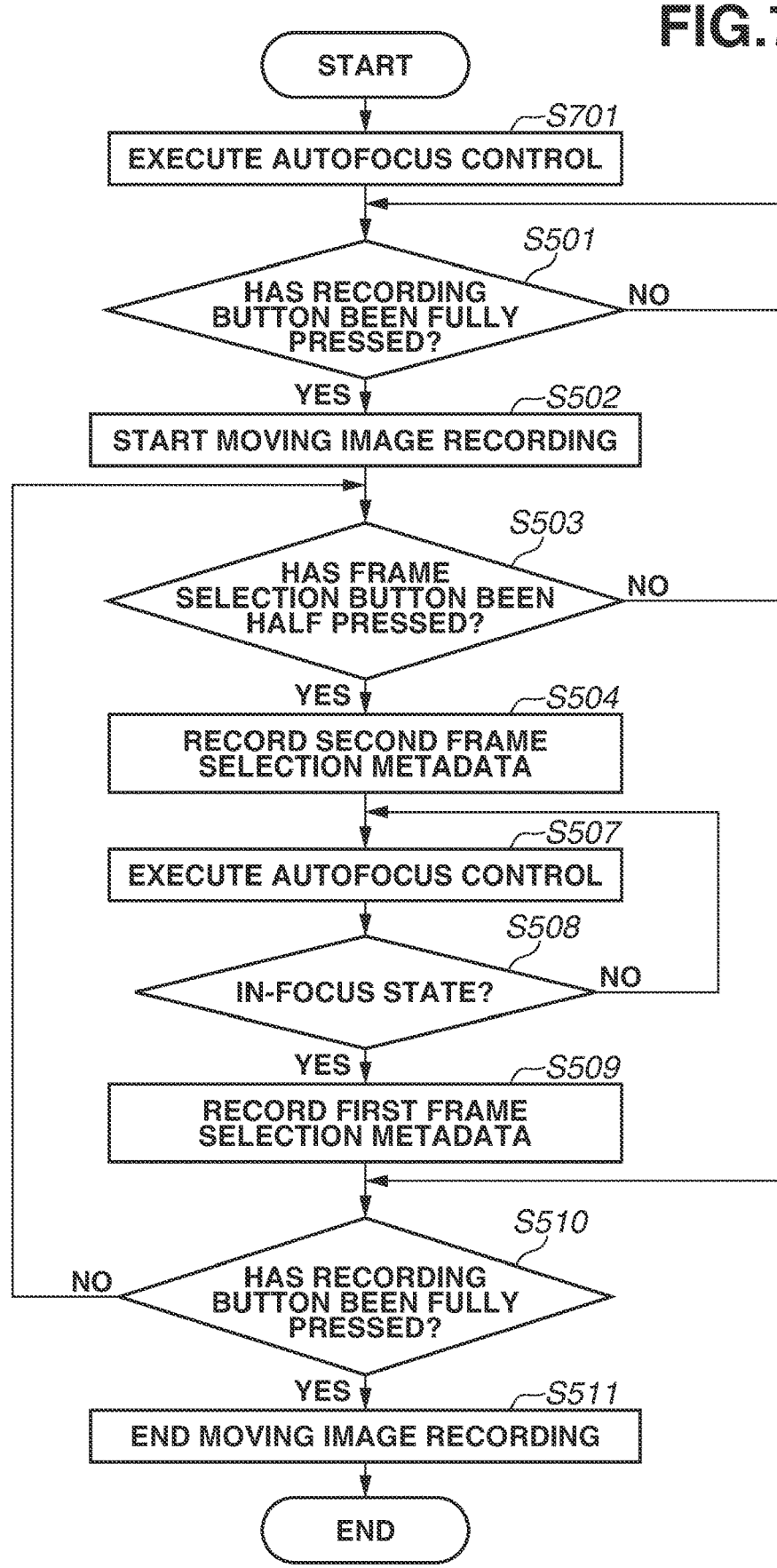
FIG. 7 is a flowchart illustrating moving image recording processing executed by an imaging apparatus according to the second exemplary embodiment.

FIG. 7 is a flowchart illustrating moving image recording processing executed under the control of the system control microcomputer 114 according to the second exemplary embodiment.

In contrast to FIG. 5, processing in steps S505, S506, S513, and S514 is not executed in FIG. 7. In place of the processing, processing in step S701 is added prior to step S501.

In step S701, the system control microcomputer 114 executes the AF control. While the AF control is started in accordance with the half press of the frame selection button 205 or the half press of the recording button 204 in the first exemplary embodiment, in the second exemplary embodiment, the AF control is started before moving image recording is started.

If it is determined in step S503 that the frame selection button 205 is not in the half-pressed state (NO in step S503), the processing proceeds to step S510. This means that first frame selection metadata is applied only when two conditions are both satisfied. One of the two conditions is the frame selection button 205 being in the half-pressed state, and the other one is the in-focus state being caused.

As described above, also when AF is continuously executed in step S701, frame selection metadata suitable for the state of the AF control can be appropriately recorded.

Then, in steps S503, S504, and S507 to S509, it becomes possible to record frame selection metadata that appropriately reflects both the half-pressed state of the frame selection button 205 that is caused by a user operation, and an in-focus state determination result.

Next, a third exemplary embodiment will be described. The configuration and basic processing operations of the imaging apparatus 100 are alike those in the first and second exemplary embodiments. Hereinafter, a difference from the first and second exemplary embodiments will be mainly described.

In the third exemplary embodiment, an example of executing manual focusing (AF control is not operated) will be described.

Figure 8:
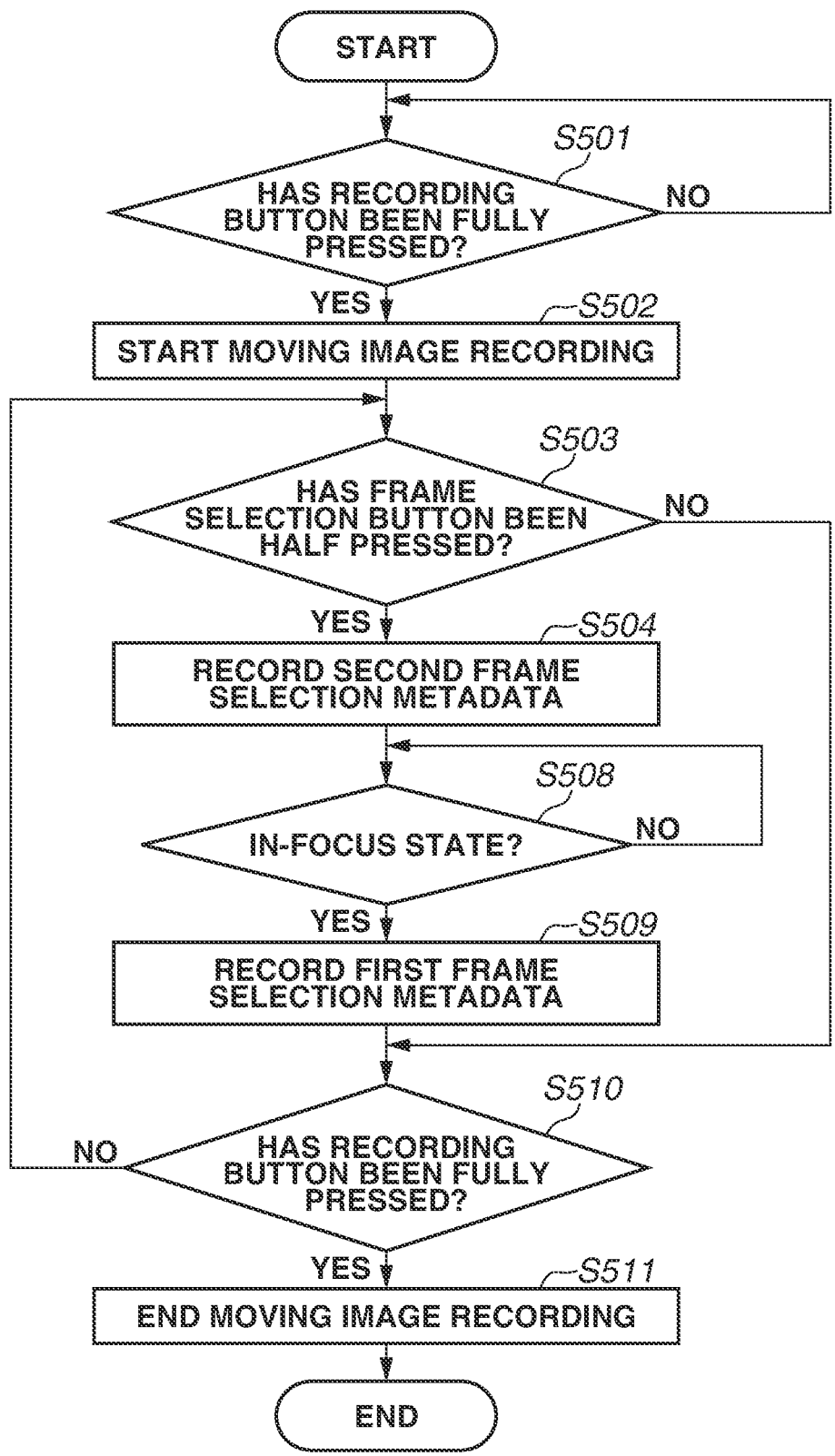
FIG. 8 is a flowchart illustrating moving image recording processing executed by an imaging apparatus according to a third exemplary embodiment.

FIG. 8 is a flowchart illustrating moving image recording processing executed under the control of the system control microcomputer 114 according to the third exemplary embodiment.

In contrast to FIG. 7, processing in steps S507 and S701 is not executed in FIG. 8. In place of the processing, a manual focusing operation is performed. The manual focusing operation is an operation of adjusting the position of the lens 101 by the user operating a focus ring member (not illustrated), for example.

In this manner, even when the imaging apparatus 100 operates in a manual focusing mode, in steps S503, S504, S508, and S509, it becomes possible to record frame selection metadata that appropriately reflects both the half-pressed state of the frame selection button 205 that is caused by a user operation and an in-focus state determination result.

In the first to third exemplary embodiments, the in-focus state is used as a condition for frame selection metadata application, but another imaging control state may be used as a condition for frame selection metadata application. For example, a proper exposure state may be used as a condition for frame selection metadata application. In addition, the above description has been given of a case of executing autofocus control, but autoexposure control can also be executed in like manner. It accordingly becomes possible to efficiently perform a still image output work that is based on high-quality frame image, near a timing intended by the user, in a case where a still image output is performed on editing software.

In addition, the fully-pressed state of the frame selection button 205 may be utilized. For example, frame selection metadata may be applied to a frame image generated when the frame selection button 205 is in the fully-pressed state, irrespective of an imaging control state, and information indicating that the priority of a timing is higher than that of the in-focus state may also be applied. It accordingly becomes possible to identify whether the user prioritizes a focusing degree or a timing, depending on whether the frame selection button 205 is half pressed or fully pressed. It therefore becomes possible to present a frame image to which frame selection metadata is applied while reflecting the intention of the user more, as a candidate of a still image output.

In addition, when the frame selection button 205 is half pressed, frame selection metadata may be applied to a frame image generated when a predetermined time elapses. Even if a time required until the in-focus state is caused becomes longer than expected, in accordance with the status of a subject in AF or an operation degree in manual focusing, frame selection metadata can be applied without missing a timing.

Next, a fourth exemplary embodiment will be described. The configuration and basic processing operations of the imaging apparatus 100 are alike those in the first to third exemplary embodiments. Hereinafter, a difference from the first to third exemplary embodiments will be mainly described.

In the fourth exemplary embodiment, the description will be given of an example of executing face tracking AF control, which is subject tracking autofocus control.

Figure 9:
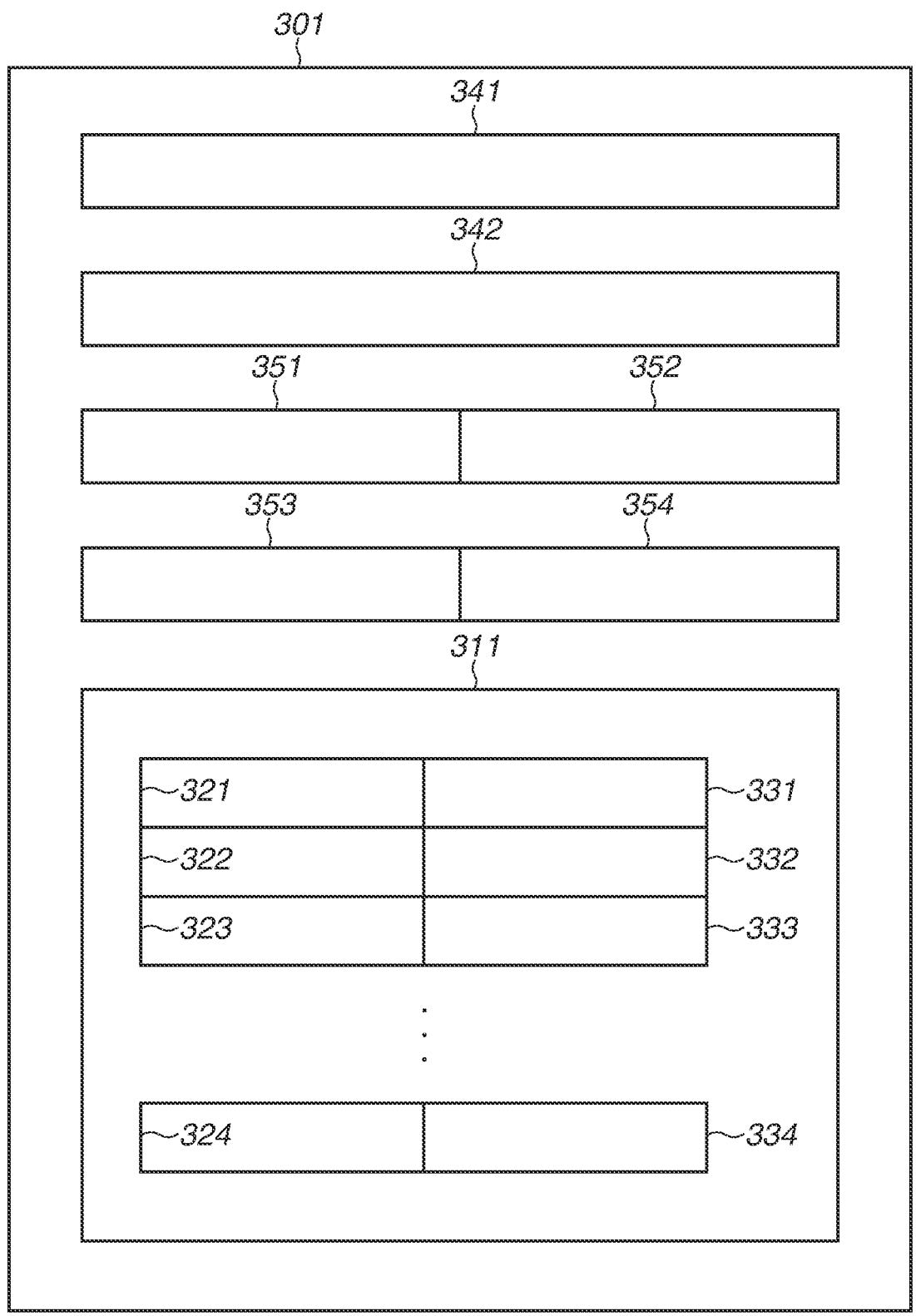
FIG. 9 is a diagram illustrating a data structure of a moving image data file according to a fourth exemplary embodiment.

FIG. 9 is a diagram illustrating a data structure of a moving image data file 301 to be recorded onto the recording medium 117.

As in FIG. 3, the moving image data file 301 includes the moving image data 311. The configuration of the moving image data 311 is alike that in the first exemplary embodiment.

As in FIG. 3, the moving image data file 301 includes the first frame selection metadata 341 and the second frame selection metadata 342. In some cases, a plurality of pieces of first frame selection metadata 341 and a plurality of pieces of second frame selection metadata 342 are recorded. The moving image data file 301 also includes first tracking period starting point metadata 351 and first tracking period end point metadata 352. In the first tracking period starting point metadata 351, time code data corresponding to frame image data serving as a starting point of a first tracking period is recorded. In the first tracking period end point metadata 352, time code data corresponding to frame image data serving as an end point of the first tracking period is recorded. In like manner, the moving image data file 301 includes second tracking period starting point metadata 353 and second tracking period end point metadata 354. In the second tracking period starting point metadata 353, time code data corresponding to frame image data serving as a starting point of a second tracking period is recorded. In the second tracking period end point metadata 354, time code data corresponding to frame image data serving as an end point of the second tracking period is recorded.

Figure 10:
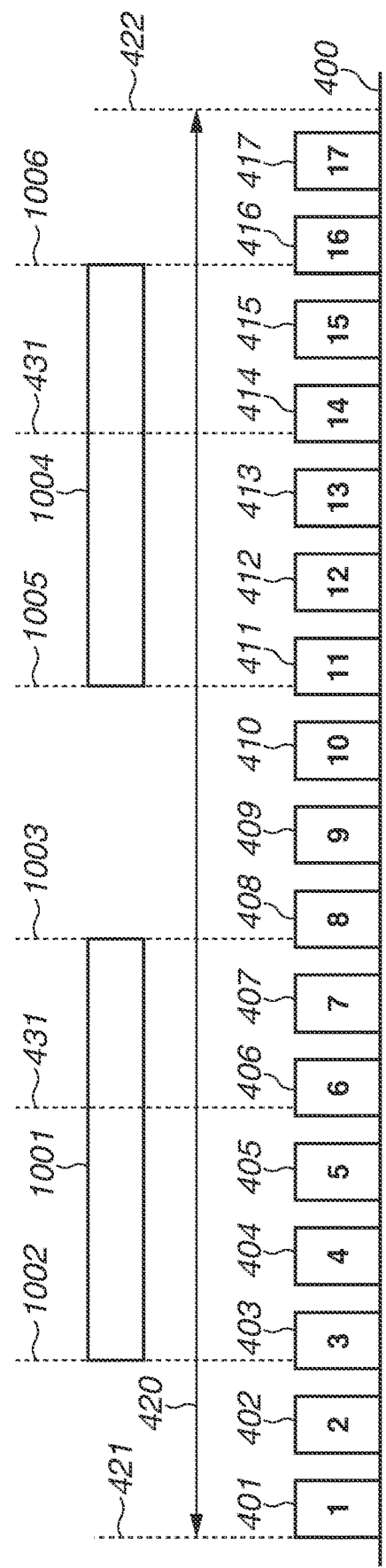
FIG. 10 is a diagram illustrating a timing relationship between a frame selection button operation, autofocus control, and frame selection metadata application according to the fourth exemplary embodiment.

FIG. 10 is a diagram illustrating a timing relationship between a frame selection button operation, AF control, and frame selection metadata application according to the fourth exemplary embodiment.

In contrast to FIG. 4, the AF control period 430 is deleted.

In the moving image recording period 420, a timing 1002 indicates a first face tracking AF control start timing and a timing 1003 indicates a first face tracking AF control end timing. A period between the timings 1002 and 1003 becomes a first tracking period 1001. At the first face tracking AF control start timing 1002, the first tracking period starting point metadata 351 is recorded. In addition, at the first face tracking AF control end timing 1003, the first tracking period end point metadata 352 is recorded. The first tracking period starting point metadata 351 and the first tracking period end point metadata 352 serve as tracking period information indicating a period in which the face tracking AF control is executed.

A frame selection button half pressed timing 431 falls within the first tracking period 1001. This means that a face being a subject to be tracked is in the in-focus state at the time point of the frame selection button half pressed timing 431. Thus, at the frame selection button half pressed timing 431, the first frame selection metadata 341 and the second frame selection metadata 342 are recorded onto the recording medium 117.

In the moving image recording period 420, a timing 1005 indicates a second face tracking AF control start timing and a timing 1006 indicates a second face tracking AF control end timing. A period between the timings 1005 and 1006 becomes a second tracking period 1004. At the second face tracking AF control start timing 1005, the second tracking period starting point metadata 353 is recorded. In addition, at the second face tracking AF control end timing 1006, the second tracking period end point metadata 354 is recorded. The second tracking period starting point metadata 353 and the second tracking period end point metadata 354 serve as tracking period information indicating a period in which the face tracking AF control is executed.

The frame selection button half pressed timing 431 falls within the second tracking period 1004. This means that a face being a subject to be tracked is in the in-focus state at the time point of the frame selection button half pressed timing 431. Thus, at the frame selection button half pressed timing 431, the first frame selection metadata 341 and the second frame selection metadata 342 are recorded onto the recording medium 117.

Figure 11:
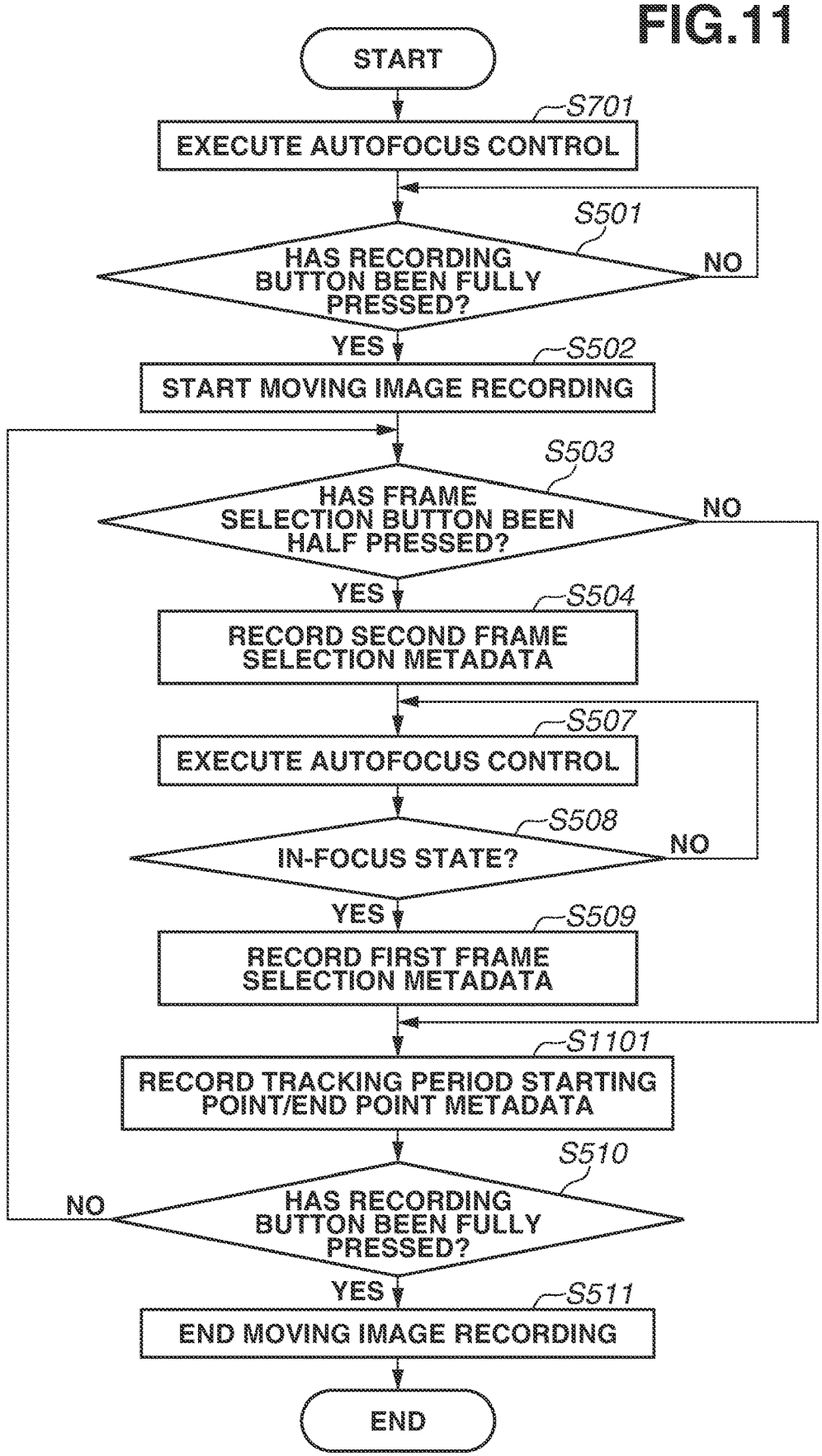
FIG. 11 is a flowchart illustrating moving image recording processing executed by an imaging apparatus according to the fourth exemplary embodiment.

FIG. 11 is a flowchart illustrating moving image recording processing executed under the control of the system control microcomputer 114 according to the fourth exemplary embodiment. Hereinafter, a difference from the flowchart illustrated in FIG. 7 will be mainly described.

In step S701, the system control microcomputer 114 executes the AF control. In the fourth exemplary embodiment, the AF control is started before moving image recording is started, and the face tracking AF control is executed as the AF control.

The face tracking AF will now be described. In the face tracking AF, when a face is detected from a subject, the AF control is started in such a manner as to place a focus on the face. Then, even when a face detected position moves in a field angle in which image capturing and recording are performed, the AF control is continued in such a manner as to track the face detected position and place a focus on the face. If a face being a subject moves outside the field angle in which image capturing is performed and the face becomes undetectable, the AF control ends. Then, if a face is detected again from a subject, the AF control is started in such a manner as to place a focus on the face.

After step S509 or if it is determined in step S503 that the frame selection button 205 is not in the half-pressed state (NO in step S503), the processing proceeds to step S1101.

In the present exemplary embodiment, because the frame selection button half pressed timing 431 falls within the tracking period 1001 or 1004, the in-focus state is already established at the frame selection button half pressed timing 431. Thus, if it is determined in step S503 that the frame selection button 205 is in the half-pressed state (YES in step S503), the processing in step S509 is executed substantially concurrently with the processing in step S504. In other words, the first frame selection metadata 341 and the second frame selection metadata 342 are recorded at the frame selection button half pressed timing 431, and time code values recorded in the first frame selection metadata 341 and the second frame selection metadata 342 become the same.

In step S1101, the system control microcomputer 114 records tracking period starting point/end point metadata. More specifically, the first tracking period starting point metadata 351 is recorded at the first face tracking AF control start timing 1002 and the first tracking period end point metadata 352 is recorded at the first face tracking AF control end timing 1003. In addition, the second tracking period starting point metadata 353 is recorded at the second face tracking AF control start timing 1005 and the second tracking period end point metadata 354 is recorded at the second face tracking AF control end timing 1006. Then, the processing proceeds to step S510.

Figure 12:
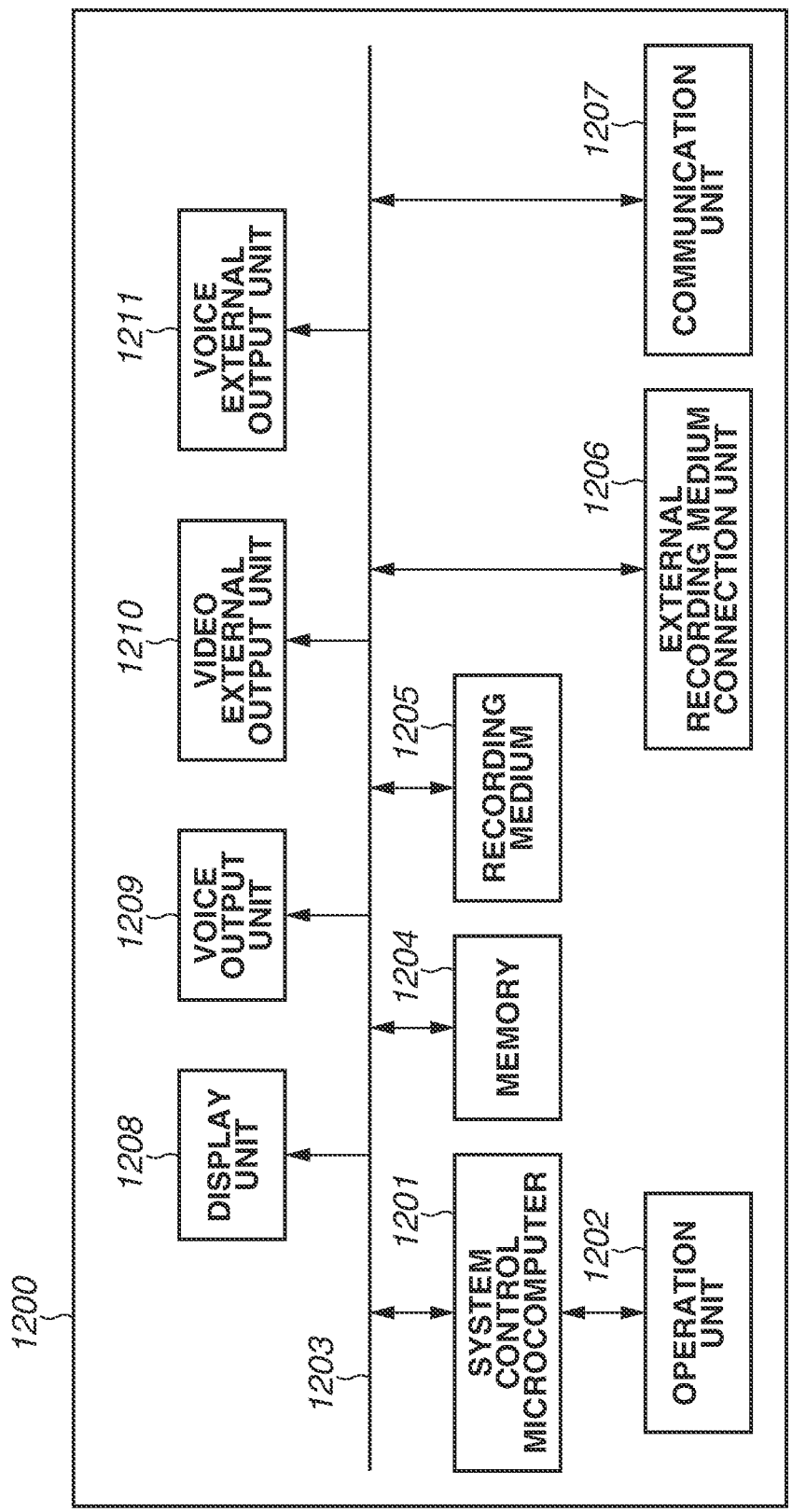
FIG. 12 is a block diagram illustrating a configuration of an information processing apparatus according to the fourth exemplary embodiment.

Next, an information processing apparatus 1200 for performing a still image output work using the moving image data file 301 will be described. FIG. 12 is a block diagram illustrating a configuration of the information processing apparatus 1200.

A system control microcomputer 1201 includes a central processing unit (CPU) (micro processing unit (MPU)) and a memory (dynamic random access memory (DRAM), static RAM (SRAM)), for example. By executing various types of processing (programs), the system control microcomputer 1201 controls blocks of the information processing apparatus 1200 and controls data transmission and reception that are performed between the blocks. The system control microcomputer 1201 controls the blocks of the information processing apparatus 1200 in accordance with an operation signal issued via an operation unit 1202 that receives an operation from the user.

The operation unit 1202 includes a power button, a keyboard, a mouse, a pointing device, and a touch panel. When the keyboard or the mouse is operated by the user, the operation unit 1202 transmits an operation signal to the system control microcomputer 1201.

A bus 1203 is a general-purpose bus for transmitting various types of data, a control signal, and an instruction signal to the blocks of the information processing apparatus 1200.

A memory 1204 is a random access memory (RAM) or a flash memory, for example, and includes both of a nonvolatile memory and a volatile memory that temporarily stores an image signal and a voice signal, and setting information of the information processing apparatus 1200.

A recording medium 1205 is a recording medium incorporated in the information processing apparatus 1200. On the recording medium 1205, various types of data to be handled by the information processing apparatus 1200 can be recorded. Examples of the recording medium 1205 include a hard disk, a solid state drive (SSD), an optical disk, and a flash memory.

An external recording medium connection unit 1206 is a connection unit for connecting an external recording medium to the information processing apparatus 1200. Various types of data to be handled by the information processing apparatus 1200 can be recorded on the external recording medium. Examples of the external recording medium include a hard disk, an SSD, an optical disk, and a flash memory.

A communication unit 1207 is a communication unit for the information processing apparatus 1200 to communicate with an external information processing apparatus. The external information processing apparatus can perform image processing like the information processing apparatus 1200. Examples of the external information processing apparatus include a smartphone, a tablet computer, and a personal computer. Examples of the external information processing apparatus further include a digital video camera and a digital still camera that each include an imaging unit and an image recording unit.

A display unit 1208 displays image data recorded on the recording medium 1205 or an external recording medium connected via the external recording medium connection unit 1206, and a graphical user interface (GUI) of various menus. For example, a liquid crystal display or an organic electroluminescence (EL) display can be used as the display unit 1208.

A voice output unit 1209 includes a speaker and a drive unit of the speaker, for example, and outputs voice based on a voice signal recorded on the recording medium 1205 or an external recording medium.

A video external output unit 1210 is an output unit for connecting an external video display device to the information processing apparatus 1200. The video external output unit 1210 displays, on the external video display device, image data recorded on the recording medium 1205 or an external recording medium connected via the external recording medium connection unit 1206, and a GUI of various menus. Example of the external video display device include a television and a monitor.

A voice external output unit 1211 is an output unit for connecting an external voice output device to the information processing apparatus 1200. The voice external output unit 1211 outputs voice based on a voice signal recorded on the recording medium 1205 or an external recording medium. Examples of the external voice output device include a speaker and a headphone.

Figure 13:
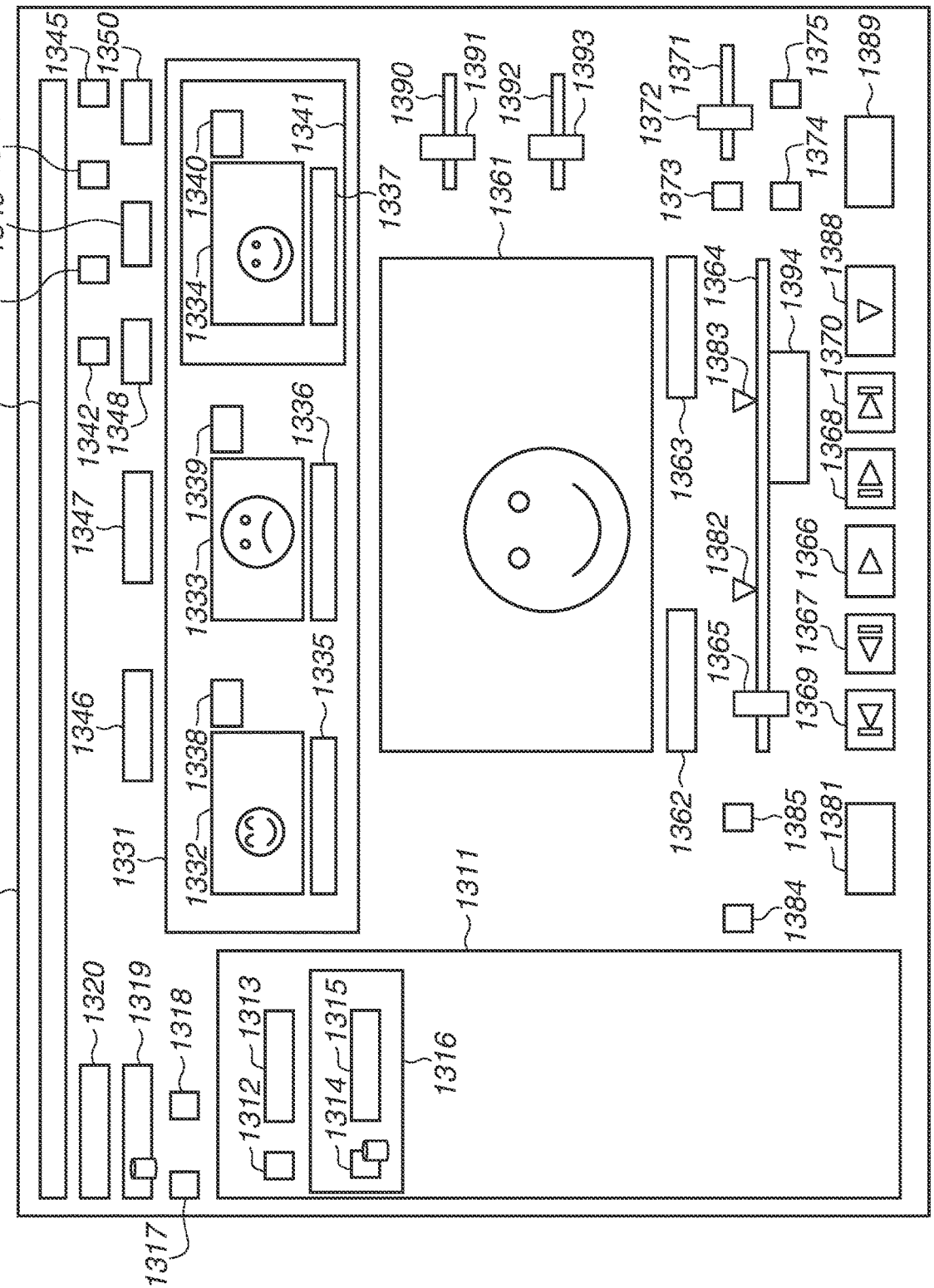
FIG. 13 is a diagram illustrating an example of an interface screen displayed on a display unit of the information processing apparatus according to the fourth exemplary embodiment.

FIG. 13 illustrates an example of an interface screen 1301 displayed on the display unit 1208 of the information processing apparatus 1200. The interface screen 1301 is displayed on the full screen of the display unit 1208, but when a plurality of windows can be displayed, the interface screen 1301 may be displayed as one window of the plurality of windows. While the interface screen 1301 is displayed on the display unit 1208 in this example, the interface screen 1301 may be displayed on an external video display device via the video external output unit 1210.

A menu 1302 is a menu for selecting and executing a function executable by the information processing apparatus 1200. If the menu 1302 is selected via the operation unit 1202, the details of menus are displayed as pull-down menus. By further selecting a menu desired to be executed from among the detailed menus, a desired function can be executed. Items of the menus include, as major items, a file menu related to a file operation, an editing menu related to an editing operation, a display menu related to a display operation, a tool menu related to settings, and a help menu for displaying an instruction manual.

A media list 1311 is a list of media to be recognized by the information processing apparatus 1200. Types of media include a medium 1312 and a virtual medium 1314. The medium 1312 is displayed when the attachment of a memory card is recognized by the external recording medium connection unit 1206 of the information processing apparatus 1200. The medium 1312 is also displayed when the attachment of a memory card connected to the external recording medium connection unit 1206 of the information processing apparatus 1200 connected in a mass storage class operation state via communication is recognized. Alternatively, the medium 1312 may be displayed when an external recording medium is recognized by other means. The virtual medium 1314 is a medium for handling, in a case where various types of data are recorded in a hierarchical structure on the recording medium 1205 of the information processing apparatus 1200, a folder in a specific hierarchy in the information processing apparatus 1200 as a virtual medium. Next to the medium 1312, a medium name 1313 can be displayed together. While only one medium 1312 is displayed in FIG. 13, in a case where a plurality of media 1312 is recognized in the information processing apparatus 1200, the plurality of media 1312 can be displayed. Each of the plurality of media 1312 is distinguishable by setting different names in media names 1313 corresponding to the respective media 1312. In addition, next to the virtual medium 1314, a virtual medium name 1315 can be displayed together. While only one virtual medium 1314 is displayed in FIG. 13, when a plurality of virtual media 1314 is recognized in the information processing apparatus 1200, the plurality of virtual media 1314 can be displayed. At this time, the plurality of virtual media 1314 are distinguishable from each other by setting different names in virtual media names 1315 corresponding to the respective virtual media 1314. A medium selection frame 1316 indicates the medium 1312 or the virtual medium 1314 that is in a selected state. A plurality of media 1312 or virtual media 1314 can be selected. The medium selection frame 1316 can be operated via the operation unit 1202. In a case where the medium selection frame 1316 is operated via a keyboard, the position of the medium selection frame 1316 is changed by operating an arrow key included in the keyboard. For example, by operating an up-arrow key in a state where the virtual medium 1314 is selected in FIG. 13, the state can be changed to a state where the medium 1312 provided immediately above the virtual medium 1314 in the media list 1311 is selected.

A virtual media creation button 1317 is a button for creating the virtual medium 1314. By pressing the virtual media creation button 1317, the virtual medium 1314 is created under a folder in a preset hierarchy of the recording medium 1205. At this time, the virtual medium name 1315 can also be set on a subwindow display (not illustrated).

A virtual media deletion button 1318 is a button for deleting the virtual medium 1314. By pressing the virtual media deletion button 1318 in a state where the virtual medium 1314 is selected in the medium selection frame 1316, the selected virtual medium 1314 is deleted.

A backup button 1319 executes image data backup based on a user operation. By pressing the backup button 1319 in a state where the medium 1312 is selected in the medium selection frame 1316, the following processing is performed. First of all, a virtual medium 1314 is newly created. Next, image data recorded on the medium 1312 is copied onto the newly-created virtual medium 1314. The backup button 1319 enables backup involving two operations including the creation of a virtual medium and the copy of image data, to be executed by one operation of pressing the backup button 1319. This streamlines the work of the user and enhances the convenience.

An automatic backup operation mode display unit 1320 is a display region for displaying a state of an automatic backup operation mode. The automatic backup is a function of executing, in a case where the connection of the medium 1312 is recognized, a function like a function to be executed when the backup button 1319 is pressed, even without pressing the backup button 1319.

Depending on use situations, the user may desire to use the automatic backup in some cases, and the user may not desire to use the automatic backup in other cases. Examples of the case where the user desires to use the automatic backup include a case where the user desires to efficiently execute a backup work on image data captured by the imaging apparatus 100 and recorded on a memory card. Efficient execution means that operation procedures to be executed by the user are simplified. Specifically, the efficient execution means that an operation of the operation unit 1202 can be emitted. Particularly in the case of a business purpose, a cooperation work is performed by a plurality of workers, and inexperienced workers participate in the cooperation work in many cases. Moreover, because a work failure leads directly to a financial loss especially in the case of a business purpose, a work failure is sometimes regarded as the most significant problem to be avoided. In such cases, by simplifying operation procedures even one action of the press of a button, a worker can benefit from the avoidance of a work failure. Furthermore, especially in the case of a business purpose, a cameraman who operates a camera, a backup worker who performs data backup, and an editor who uses backup data for editing make up a team and work in cooperation. In the work, a flow of a plurality of works to be executed by a plurality of members in cooperation is sometimes executed as a routine work. In the case of repeating such a fixed work, by simplifying operation procedures even one action of the press of a button, a worker can receive a benefit being the avoidance of a work failure.

On the other hand, the user may not desire to use the automatic backup in other cases. Examples of such cases include a case where the above-described routine work is completed, and the user desires to simply check image data recorded on a memory card. In such a case, an automatic backup function can be deactivated. A sub-dialog (not illustrated) is displayed from the menu 1302, and the setting of the information processing apparatus 1200 is performed on the sub-dialog. By disabling the automatic backup function in this manner, the automatic backup function can be deactivated.

A clip list 1331 is a list for displaying a list of pieces of image data recorded on the medium 1312 or the virtual medium 1314 selected in the media list 1311. Hereinafter, image data will be referred to as a clip. A thumbnail image 1332 is a representative image corresponding to one clip. In like manner, thumbnail images 1333 and 1334 are representative images each corresponding to one clip. In other words, FIG. 13 illustrates a state where three clips are displayed in the clip list 1331. FIG. 13 also illustrates a state where the three clips are recorded on the medium 1312 or the virtual medium 1314 selected in the media list 1311. In the clip list 1331, a clip name and metadata information that correspond to each clip are also displayed. In a clip name 1335, a clip name of a clip corresponding to the thumbnail image 1332 is displayed. In the clip name 1335, metadata to be recorded in association with the clip may be displayed together with the clip name. In like manner, a clip name and metadata of a clip corresponding to the thumbnail image 1333 are displayed in a clip name 1336, and a clip name and metadata of a clip corresponding to the thumbnail image 1334 are displayed in a clip name 1337. In the clip list 1331, an icon 1338 is also displayed. In the icon 1338, metadata associated with the clip identified from the thumbnail image 1332 is displayed as an icon. In like manner, in an icon 1339, metadata associated with the clip identified from the thumbnail image 1333 is displayed as an icon, and in an icon 1340, metadata associated with the clip identified from the thumbnail image 1334 is displayed as an icon. A clip selection frame 1341 is a selection frame indicating a clip selected from among one or a plurality of clips displayed in the clip list 1331. FIG. 13 illustrates a state where the clip identified from the thumbnail image 1334, the clip name 1337, and the icon 1340 is selected.

By pressing a clip list large thumbnail display mode button 1342, the clip list 1331 is displayed in a large thumbnail mode. The large thumbnail mode is a mode for displaying a thumbnail image larger that in a small thumbnail mode. By pressing a clip list small thumbnail display mode button 1343, the clip list 1331 is displayed in the small thumbnail mode. FIG. 13 illustrates a state where the clip list 1331 is displayed in the small thumbnail mode. By pressing a clip list information-added thumbnail display mode button 1344, the clip list 1331 is displayed in an information-added thumbnail mode. The information-added thumbnail mode is a mode in which the number of metadata display items is increased from those in the large thumbnail mode and the small thumbnail mode. By pressing a clip list detailed display mode button 1345, the clip list 1331 is displayed in a detailed display mode. The detailed display mode is a mode in which thumbnail images are hidden and clip names and pieces of metadata are displayed as a list.

A simplified search item setting unit 1346, a simplified search condition setting unit 1347, a search all button 1348, a refine search button 1349, and a display all button 1350 are setting units and buttons related to a simplified search function. The simplified search is a function of searching clips displayed in the clip list 1331, using a set search condition, and accordingly displaying only a clip satisfying the search condition, in the clip list.

The simplified search item setting unit 1346 sets an item to be used as a search condition for the simplified search. Specifically, from among metadata items recorded in association with a clip, the simplified search item setting unit 1346 sets a metadata item to be used as a search key. For example, the simplified search item setting unit 1346 can set a clip name, image capturing time and date, a status (OK mark, etc.), a clip title (arbitrary character string), a photographer (arbitrary character string), an image capturing location (arbitrary character string), or an image capturing target (arbitrary character string).

The simplified search condition setting unit 1347 is a setting unit that further sets, in accordance with a metadata item selected and set by the simplified search item setting unit 1346, a metadata value of the metadata item to be used as a search condition. Specifically, when a clip name, a clip title, a photographer, an image capturing location, or an image capturing target is selected by the simplified search item setting unit 1346, an arbitrary character string can be set as a search condition. For example, in a case where the clip list 1331 includes three clips having "AA0001", "AB0001", and "AC0001" as clip names, when the simplified search item setting unit 1346 sets a clip name and the simplified search condition setting unit 1347 sets a character string "AA", only the clip having "AA0001" as a clip name is displayed in the clip list 1331 as a result of simplified search execution.

The search all button 1348 is a button for executing search in a state where the simplified search has not been executed. In other words, even when the clip list 1331 is displayed in a state where the simplified search has already been executed, by pressing the search all button 1348, new search can be executed without reflecting simplified search results obtained so far.

The refine search button 1349 is a button for further performing refine search from a state where the simplified search has already been executed on the clip list 1331, and only a clip satisfying a simplified search condition is displayed. For example, in a case where clips having "AA0001", "AA0002", and "AB0001" as clip names are displayed in the clip list 1331 in a state where simplified search has not been executed. As a result of executing simplified search using a clip name as a search item and "AA" as a search condition, the clips having "AA0001" "AA0002" as clip names are displayed. The refine search is further executed from the state using "0001" set as a search condition. As a result, the clip having "AA0002" as a clip name is not displayed, and only the clip having "AA0001" as a clip name is displayed.

The display all button 1350 is a button for cancelling a simplified search execution result and displaying, in the clip list 1331, all the clips recorded on the medium 1312 or the virtual medium 1314 selected in the media list 1311.

A preview image 1361 is a region for displaying a reproduction image of the clip displayed in the clip list 1331. A time code 1362 displays a time code corresponding to a frame image displayed in the preview image 1361. For example, when a time code indicates 12 hours, 34 minutes, 56 seconds, and 12 frames, the time code 1362 displays "12:34:56:12". A duration 1363 displays a time length of the clip displayed in the clip list 1331. For example, when a time length of the clip is 1 hour, 23 minutes, 45 seconds, and 21 frames, the duration 1363 displays "01:23:45:21".

A slider bar 1364 and a slider bar operation unit 1365 indicate a current reproduction position in the time length of the clip. Specifically, a temporal position of the current clip reproduction is displayed based on the position of the slider bar operation unit 1365 with respect to the slider bar 1364. In addition, by operating and moving the slider bar operation unit 1365 via the operation unit 1202, the frame image displayed in the preview image 1361 can be changed.

A reproduction button 1366 is a button for performing a toggle operation. By pressing the reproduction button 1366 via the operation unit 1202, normal reproduction (1× speed reproduction in a forward direction) of the preview image 1361 can be performed. During the normal reproduction, the reproduction button 1366 is displayed as a stop button (not illustrated), and by pressing the button again, the reproduction of the preview image 1361 can be stopped.

A one-frame back button 1367 changes a reproduction position only by one frame in a time axis past direction from the preview image 1361 in a reproduction stopped state. A one-frame forward button 1368 changes a reproduction position only by one frame in a time axis future direction from the preview image 1361 in a reproduction stopped state.

A jump-to-start button 1369 changes a frame image displayed in the preview image 1361, to a frame image corresponding to a start time code. A jump-to-end button 1370 changes a frame image displayed in the preview image 1361, to a frame image corresponding to an end time code.

By pressing a mark list button 1381, a mark list dialog (not illustrated) is displayed. One or a plurality of shot marks and event marks are displayed as a list on the mark list dialog. The shot mark refers to metadata to be applied to a frame image corresponding to a specific time code that has been specified by a button operation performed on the imaging apparatus 100. The event mark is a mark automatically applied in accordance with the state of the imaging apparatus 100. For example, if a face is recognized during the image capturing performed by the imaging apparatus 100, metadata is applied to a frame image corresponding to a time code of the time point.

While the shot mark can be applied by the imaging apparatus 100, the shot mark can also be applied by the press of a shot mark button 1388 to a frame image generated at the press time point.

A shot mark display 1382 indicates a position on the slider bar 1364 at which the shot mark is recorded. The shot mark display 1382 is displayed at a time code position recorded in the first frame selection metadata 341 in the first tracking period 1001. A jump-to-previous shot mark button 1384 changes, in a case where the shot mark display 1382 exists at a position in the time axis past direction of the slider bar operation unit 1365, a frame image to be displayed in the preview image 1361, to a frame image corresponding to the downstream position. A jump-to-next shot mark button 1385 changes, when the shot mark display 1382 exists at a position in the time axis future direction of the slider bar operation unit 1365, a frame image to be displayed in the preview image 1361, to a frame image corresponding to the position. In FIG. 13, by pressing the jump-to-next shot mark button 1385, a frame image to be displayed in the preview image 1361 can be changed from a frame image corresponding to the current position of the slider bar operation unit 1365, to a frame image corresponding to the position of the shot mark display 1382.

A shot mark display 1383 indicates a position on the slider bar 1364 at which the shot mark is recorded. The shot mark display 1383 is displayed at a time code position recorded in the first frame selection metadata 341 in the second tracking period 1004.

A tracking period display 1394 displays a period in which the face tracking AF control is performed. In FIG. 13, the tracking period display 1394 displays a second tracking period that is indicated by the second tracking period starting point metadata 353 and the second tracking period end point metadata 354, and is a tracking period including the shot mark display 1383.

A voice slider bar 1371 and a voice slider bar operation unit 1372 serve as a setting unit for setting volume of voice to be reproduced by the voice output unit 1209 or the voice external output unit 1211 of the information processing apparatus 1200. By pressing a mute button 1373, voice can be prevented from being output, irrespective of the position of the voice slider bar operation unit 1372. By pressing a channel one button 1374, voice of only a channel one can be prevented from being output. By pressing a channel two button 1375, voice of only a channel two can be prevented from being output.

By pressing a look-up table (LUT) button 1389, a preset LUT can be applied to a gamma characteristic of a display image to be displayed in the preview image 1361. For example, a LUT of converting a gamma characteristic from a Log gamma characteristic to a BT709 gamma characteristic is applied to a clip captured with a Log gamma characteristic. An image having a gamma characteristic converted into a BT709 gamma characteristic can be accordingly displayed in the preview image 1361.

In addition, a white balance adjustment slider bar 1390 and a white balance adjustment slider bar operation unit 1391 are provided. In addition, an exposure adjustment slider bar 1392 and an exposure adjustment slider bar operation unit 1393 are provided.

Figure 14:
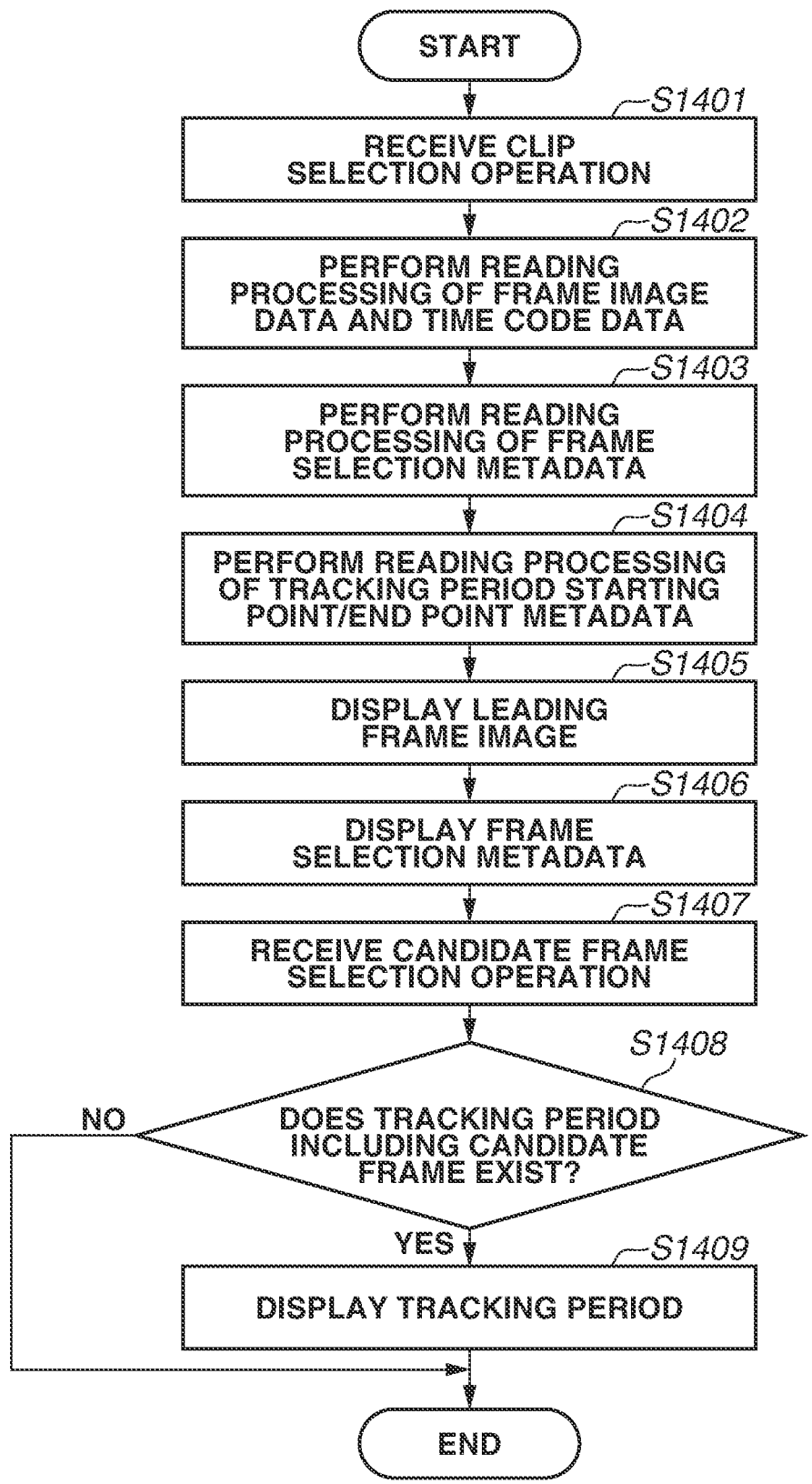
FIG. 14 is a flowchart illustrating processing executed by the information processing apparatus according to the fourth exemplary embodiment.

FIG. 14 is a flowchart illustrating processing executed under the control of the system control microcomputer 1201 of the information processing apparatus 1200.

In step S1401, the system control microcomputer 1201 receives a clip selection operation. By operating the clip selection frame 1341 via the operation unit 1202, a clip is selected from among one or a plurality of clips displayed in the clip list 1331.

In step S1402, the system control microcomputer 1201 performs reading processing of frame image data and time code data. The system control microcomputer 1201 performs reading processing of the time code data 321 and the frame image data 331 from the moving image data file 301 of the clip selected in step S1401. When the clip selection is performed for the first time, the system control microcomputer 1201 performs reading processing of leading time code data and leading frame image data in the moving image data 311.

In step S1403, the system control microcomputer 1201 performs reading processing of frame selection metadata. The system control microcomputer 1201 acquires the first frame selection metadata 341 and the second frame selection metadata 342 from the moving image data file 301 of the clip selected in step S1401.

In step S1404, the system control microcomputer 1201 performs reading processing of tracking period starting point metadata and tracking period end point metadata. The system control microcomputer 1201 acquires the first tracking period starting point metadata 351, the first tracking period end point metadata 352, the second tracking period starting point metadata 353, and the second tracking period end point metadata 354 from the moving image data file 301 of the clip selected in step S1401.

In step S1405, the system control microcomputer 1201 displays a leading frame image. The system control microcomputer 1201 displays, in the preview image 1361, the frame image data 331 read in step S1402.

In step S1406, the system control microcomputer 1201 displays frame selection metadata read in step S1403. Specifically, the system control microcomputer 1201 displays the first frame selection metadata 341 and the second frame selection metadata 342. In the present exemplary embodiment, two pieces of first frame selection metadata 341 are recorded. Further, two pieces of second frame selection metadata 342 are recorded. Time code values recorded in the first frame selection metadata 341 and the second frame selection metadata 342 are the same. This means that the face tracking AF control was being executed and the subject was in the in-focus state at a time point at which the frame selection button 205 was half pressed. Thus, first frame selection metadata 341 and first second frame selection metadata 342 are displayed as the shot mark display 1382. In addition, second first frame selection metadata 341 and second second frame selection metadata 342 are displayed as the shot mark display 1383.

In step S1407, the system control microcomputer 1201 receives a selection operation of a frame image serving as an output candidate of a still image. Either the shot mark display 1382 or the shot mark display 1383 is selected by performing an operation via the operation unit 1202.

In step S1408, the system control microcomputer 1201 determines whether a tracking period including a time code at which the shot mark display selected in step S1407 is positioned exists. If the tracking period exists (YES in step S1408), the processing proceeds to step S1409, and if the tracking period does not exist (NO in step S1408), the processing ends. The system control microcomputer 1201 can determine the existence of the tracking period by referring to the first tracking period starting point metadata 351, the first tracking period end point metadata 352, the second tracking period starting point metadata 353, and the second tracking period end point metadata 354.

In step S1409, the system control microcomputer 1201 displays the tracking period. For example, in a case where the shot mark display 1383 is selected in step S1407, in step S1409, it is determined that a tracking period corresponding to the shot mark display 1383 is a second tracking period indicated by the second tracking period starting point metadata 353 and the second tracking period end point metadata 354. As a result, in step S1409, the tracking period display 1394 is displayed.

If the reproduction button 1366 is pressed in a state where the tracking period display 1394 is displayed, only the second tracking period indicated by the second tracking period starting point metadata 353 and the second tracking period end point metadata 354 is repeatedly reproduced at a slow reproduction speed.

Alternatively, when the tracking period display 1394 is displayed, a plurality of thumbnail images of the tracking period may be displayed in the clip list 1331.

As described above, in step S1409, by displaying a tracking period together with a display indicating a time axis of a moving image, it becomes easier to recognize a position of a frame image which is an output candidate of a still image.

It becomes possible to save the user the trouble of performing a frame feedforward operation by repeatedly reproducing only a corresponding tracking period.

It becomes easier for the user to select the most appropriate frame image by repeatedly reproducing the tracking period at a slow reproduction speed.

An exemplary embodiment of the present disclosure provides convenience, especially in the case of outputting a still image from a moving image in which a human is set as a subject, by the face tracking AF control of tracking a detected face.

This configuration further provides the user with convenience.

As described above, when a still image to be output from a moving image is determined, a tracking period in which a desired subject is continuously in focus can be recognized based on tracking period information. It accordingly becomes possible to easily select not only a frame image to which frame selection metadata is applied, but also another frame image in which a desired subject is continuously in focus.

According to an exemplary embodiment of the present disclosure, it becomes possible to reflect a timing intended by a user among frame images included in a moving image, and enable a frame image captured in a desirable imaging control state, to be used as a still image.

Heretofore, the exemplary embodiments of the present disclosure have been described, but the above-described exemplary embodiments merely indicate specific examples for implementing the present disclosure, and the technical scope of the present disclosure is not to be construed in a limited manner based on these exemplary embodiments. In other words, the present disclosure can be implemented in various forms without departing from the technical idea or the main features thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-085420, filed Apr. 26, 2019, which is hereby incorporated by reference herein in its entirety.

What is claimed is:

1. An imaging apparatus that captures moving image data including a plurality of frame images and records the moving image data onto a recording medium, the imaging apparatus comprising:
an operation unit configured to receive a predetermined operation;

a detection unit configured to detect, in response to receiving the predetermined operation during image capturing and recording of the moving image data, a frame image generated in the vicinity of receiving the predetermined operation and is in a predetermined state; and a recording unit configured to record a specific information in association with the detected frame image, wherein the predetermined operation serves as at least one of an operation of starting autofocus control and an operation of starting autoexposure control.

2. The imaging apparatus according to claim 1, wherein the recording unit records further the specific information in association with a frame image generated when the predetermined operation.

3. The imaging apparatus according to claim 1, wherein the predetermined state is an in-focus state.

4. The imaging apparatus according to claim 1, wherein the predetermined state is a proper exposure state.

5. The imaging apparatus according to claim 1, wherein the recording unit records further the specific information in association with a frame image generated when a predetermined time elapses from when the predetermined operation is received during image capturing and recording of the moving image data.

6. The imaging apparatus according to claim 1, wherein the recording unit records, in a case where the predetermined operation is received when subject tracking autofocus control of tracking a subject and performing focus control is executed, during image capturing and recording of the moving image data, tracking period information indicating a period in which the subject tracking autofocus control is executed.

7. An imaging apparatus that captures moving image data including a plurality of frame images and records the moving image data onto a recording medium, the imaging apparatus comprising:

an operation unit configured to receive a predetermined operation;

a detection unit configured to detect, in response to receiving the predetermined operation during image capturing and recording of the moving image data, a frame image generated in the vicinity of receiving the predetermined operation and is in a predetermined state;

a recording unit configured to record a specific information in association with the detected frame image; and a processing unit configured to start at least one piece of processing of autofocus control and autoexposure control, in a case where the predetermined operation is received during image capturing and recording of the moving image data, wherein the detection unit detects a predetermined state of a frame image captured after at least one piece of processing of the autofocus control and the autoexposure control is started.

8. The imaging apparatus according to claim 7, wherein the recording unit records further the specific information in association with a frame image generated when the predetermined operation.

9. The imaging apparatus according to claim 7, wherein the predetermined state is an in-focus state.

10. The imaging apparatus according to claim 7, wherein the predetermined state is a proper exposure state.

11. The imaging apparatus according to claim 7, wherein the recording unit records further the specific information in association with a frame image generated when a predetermined time elapses from when the predetermined operation is received during image capturing and recording of the moving image data.

12. The imaging apparatus according to claim 7, wherein the recording unit records, in a case where the predetermined operation is received when subject tracking autofocus control of tracking a subject and performing focus control is executed, during image capturing and recording of the moving image data, tracking period information indicating a period in which the subject tracking autofocus control is executed.

13. A control method of an imaging apparatus that captures moving image data including a plurality of frame images and records the moving image data onto a recording medium, the control method comprising:

receiving a predetermined operation;

detecting, in response to receiving the predetermined operation during image capturing and recording of the moving image data, a frame image generated in the vicinity of receiving the predetermined operation and is in a predetermined state; and recording a specific information in association with the detected frame image, wherein the predetermined operation serves as at least one of an operation of starting autofocus control and an operation of starting autoexposure control.

14. A non-transitory computer-readable storage medium storing a program that, when executed by a processor, causes the processor to perform operations comprising:

receiving a predetermined operation;

detecting, in response to receiving the predetermined operation during image capturing and recording of the moving image data, a frame image generated in the vicinity of receiving the predetermined operation and is in a predetermined state; and recording a specific information in association with the detected frame image, wherein the predetermined operation serves as at least one of an operation of starting autofocus control and an operation of starting autoexposure control.

15. A control method of an imaging apparatus that captures moving image data including a plurality of frame images and records the moving image data onto a recording medium, the control method comprising:

receiving a predetermined operation;

detecting, in response to receiving the predetermined operation during image capturing and recording of the moving image data, a frame image generated in the vicinity of receiving the predetermined operation and is in a predetermined state;

recording a specific information in association with the detected frame image; and starting at least one piece of processing of autofocus control and autoexposure control, in a case where the predetermined operation is received during image capturing and recording of the moving image data, wherein detecting comprises detecting a predetermined state of a frame image captured after at least one piece of processing of the autofocus control and the autoexposure control is started.

16. A non-transitory computer-readable storage medium storing a program that, when executed by a processor, causes the processor to perform operations comprising:

receiving a predetermined operation;

detecting, in response to receiving the predetermined operation during image capturing and recording of the moving image data, a frame image generated in the vicinity of receiving the predetermined operation and is in a predetermined state;

recording a specific information in association with the detected frame image; and starting at least one piece of processing of autofocus control and autoexposure control, in a case where the predetermined operation is received during image capturing and recording of the moving image data, wherein detecting comprises detecting a predetermined state of a frame image captured after at least one piece of processing of the autofocus control and the autoexposure control is started.

* * * * *